(12) United States Patent
Kelso

(10) Patent No.: US 7,172,804 B2
(45) Date of Patent: Feb. 6, 2007

(54) FILM-IMMOBILIZED CAPTURE PARTICLES

(75) Inventor: David Kelso, Wilmette, IL (US)

(73) Assignee: Northwestern University, Evanston, IL (US)

( * ) Notice: Subject to any disclaimer, the term of this patent is extended or adjusted under 35 U.S.C. 154(b) by 377 days.

(21) Appl. No.: 10/196,909

(22) Filed: Jul. 17, 2002

(65) Prior Publication Data

US 2003/0129296 A1 Jul. 10, 2003

Related U.S. Application Data

(60) Provisional application No. 60/306,015, filed on Jul. 17, 2001.

(51) Int. Cl.
*B32B 5/16* (2006.01)
*G01N 33/53* (2006.01)

(52) U.S. Cl. .................. 428/206; 428/195.1; 436/518; 436/523; 436/524; 436/528; 435/7.1; 435/287.1; 435/287.2; 435/287.9

(58) Field of Classification Search ............... 436/523, 436/518; 428/195.1
See application file for complete search history.

(56) References Cited

U.S. PATENT DOCUMENTS 5,981,180 A 11/1999 Chandler et al. ............. 435/6
6,277,489 B1 * 8/2001 Abbott et al. ................ 428/403

FOREIGN PATENT DOCUMENTS

WO 200004382 A1 * 1/2000

OTHER PUBLICATIONS

Todd J, Kink J, Leahy D, Presiel-Simmons B, Laska S, Wolff P, Jacobson P, Byrne R. Babler S. 1992. A novel semi-automated paramagnetic micromicorsphere based enzyme immunoassay for hepatitis C virus: its application to serologic testing. J Immunoassay 13:393-410.

Bennick A., Brosstad F. 1993 A rapid method for selecting specific hybridoma clones using paramagnetic Dynabeads, Scan J Immunol 38:212-214.

Jolley ME, Wang CH, Ekenberg SJ, Zuelke MS, Kelso DM. 1984. Microsphere concentration fluorescence immunoassay (PCFIA): a new, rapid immunoassay technique with high sensitivity. J Immunol Methods 67:21-35.

Walter G, Bussow K, Cahill D, Lueking A, Lehrach H. 2000. Protein arrays for gene expression and molecular interaction screening. Curr Opin Microbiol 3:298-302.

Schwab C,. Bosshard HR. 1992. Caveats for the use of surface-absorbed protein antigen to test the specificity of antibodies. J Immunol Methods 147:125-134.

Butler JE, Navarro P, Sun J. 1997, Adsorption-induced antigenic changes and their significance in ELISA and immunological disorders. Immunol Invest 26:39-54.

(Continued)

Primary Examiner—Monique R. Jackson
(74) Attorney, Agent, or Firm—Medlen & Carroll, LLP

(57) ABSTRACT

The present invention relates to film-immobilized capture particles, and substrates coated with film-immobilized capture particles. In particular, the present invention provides microarrays for detecting the presence or absence of a target in a sample employing film-immobilized capture particles. In preferred embodiments, the present provides very high density arrays that allow simultaneous analysis on a number of samples.

24 Claims, 15 Drawing Sheets

A.

B.

OTHER PUBLICATIONS

Butler JE, Ni L. Brown WR, Joshi KS, Chang J, Rosenberg B, Voss EW Jr. 1993. The immunochemistry of sandwich ELISAs—VI. Greater than 90% of monoclonal and 75% of polyclonal antifluorescyl capture antibodies are denatured by passive adsorption. Mol Immunol 30:1165-1175.

Ferguson JA, Steemers FJ, Walt DR 2000, High-density fiber-optic DNA random microsphere array. Anal Chem. 72:5618-24.

Arenkov P, Kukhlin A, Gemmell A, Voloshchuk S, Chupeeva V, Mirzabekov A, 2000. Protein microchips: use for immunoassay and enzymatic reactions. Analyt Biochem 278:123-131.

Osborne MA, Furey WS, Klenerman D, Balasubramanian S, 2000, Analytical Chem. 72:3678-3681.

Friguet B. Chaffotte AF, Ajavadi-Ohaniance L. Goldbert ME, 1985. Measurements of the true affinity constant in solution of antigen-antibody complexes by enzyme-linked immunosorbent assay. J. Immunol. Methods 77:305-319.

deWildt et al., Antibody arrays for high-throughout screening of antibody-antigen interactions, Nature Biotechnology 18:989-994 (2000).

Bruchez et al., Semiconductor nanocrystals as fluorescent biological labels, Science 281:2013-6 (1998).

MacBeath et al., Printing Proteins as microarrays for high-throughout function determination, Science 289:1760-1763 (2000).

Wilkins Stevens et al., DNA hybridization on micromicrospheres: determining capture-probe density and equilibrium dissociation constants, Nucleic Acids Res. 27:1719-1727 (1999).

Afanassiev etal., Preparation of DNA and protein micro arrays on glass slides coated with an agarose film, Nucleic Acid Research 28:i-v (2000).

Bussow K, Nordhoff E, Lilbbert C, Lehrach H, Walter G, 2000, A Human cDNA Library for HighThroughput Protein Expression Screening. Genomics 65:1-8.

* cited by examiner

A.

B.

A.

B.

A.

B.

A.

B.

FILM-IMMOBILIZED CAPTURE PARTICLES

The present Application claims priority to U.S. Provisional Application Ser. No. 60/306,015, filed Jul. 17, 2001, herein incorporated by reference.

FIELD OF THE INVENTION

The present invention relates to film-immobilized capture particles, and substrates coated with film-immobilized capture particles. The present invention also provides microarrays for detecting the presence or absence of a target molecule in a sample employing film-immobilized capture particles.

BACKGROUND OF THE INVENTION

Microparticles have been used as a solid phase in flow cytometric assays (e.g., U.S. Pat. No. 5,981,180, hereby incorporated by reference). These methods employ levels of fluorescence in the particles to identify different capture reagents. Fluorescence-coded particles have been attached to the ends of optical fibers for multiplex analyses (e.g. U.S. Pat. No. 6,023,540, hereby incorporated by reference). Microparticles have also been embedded in glass fiber filters (e.g. U.S. Pat. Nos. 5,356,785 and 5,879,881, hereby incorporated by reference), sedimented on the bottoms of microtiter wells, packed into microchannels, and attached to planar glass substrates (e.g., U.S. Pat. No. 6,133,436, hereby incorporated by reference). Single-particle assays have also been developed.

These methods are susceptible to a number of problems. When capture molecules are deposited in arrays on solid planar substrates, the volume of reagent and the efficiency of coupling can vary widely from spot to spot. The specificity and affinity of binding to the target can also be reduced from solution-phase values. When the target solution is contacted with a planar substrate, capture can be slow because a diffusion boundary layer develops. The intensity of the captured target can be reduced both because of transport-limited kinetics and the relatively large capture area.

What is needed are methods and compositions for detecting targets with increased sensitivity, and the ability to perform multiple assays simultaneously.

SUMMARY OF THE INVENTION

The present invention relates to film-immobilized capture particles, and substrates coated with film-immobilized capture particles. Specifically, the present invention provides microarrays for detecting the presence or absence of a target molecule in a sample employing film-immobilized capture particles. In some embodiments, the present invention provides methods for forming a microarray comprising, a) providing; i) a capture particle solution comprising a population of capture particles, ii) a substrate surface coated with a film, and b) spotting the capture particle solution on the film under conditions such that a plurality of capture spots are formed on the film, thereby generating a microarray. In certain embodiments, the population of capture particles comprises at least two unique capture particle species (e.g. at least 3, at least 5, at least 10 or at least 100 unique capture particle species). In particular embodiments, the size of the capture particles is approximately 0.1–10 µm in diameter. In some embodiments, the size of each capture-spot is approximately 250–750 µm in diameter (e.g. 350–600 µm in diameter, or 400–500 µm in diameter). In other embodiments, the capture particles comprise particles with capture reagents attached to their surface. In particular embodiments, the capture reagents are selected from antibodies, haptens, oligonucleotides, ligand receptors, carbohydrates, and proteins. In some embodiments, the capture reagents are selected from biotin and streptavidin. In particular embodiments, one or more reaction components are attached to the surface of the particles. In certain embodiments, one or more components of the INVADER assay is attached to the surface of the particles (e.g. primary probes, INVADER oligonucleotides, FRET cassettes, a structure specific enzyme, etc). In some embodiments, the capture particles are encoded (e.g. labeled for identification purposes). In particular embodiments, quantum dots are employed to label the capture particles.

In particular embodiments, capture particles contain functional groups on their surface (e.g. for attaching to a film). In some embodiments, the film contains functional groups (e.g. for immobilizing capture particles). In certain embodiments, the functional groups include, but are not limited to, carboxyl, amino, carboxylates, esters, alcohols, carbamides, aldehydes, amines, sulfur oxides, nitrogen oxides, and halides. In certain embodiments, spotting is conducted with a pins or an ink-jet printer (or other transfer means). In some embodiments, the spotting is conducted under conditions of ambient humidity. In preferred embodiments, the spotting is conducted under conditions of high humidity (e.g. humidity levels above ambient conditions).

In some embodiments, the present invention provides methods for generating a microarray, comprising; a) providing; i) capture reagents; ii) a particle solution comprising a population of particles, and ii) a substrate surface coated with a film; and b) combining the capture reagents and the particle solution under conditions such that a capture particle solution is generated; and c) spotting the capture particle solution onto the film under conditions such that a plurality of capture-spots are formed on the film, thereby generating a microarray. In certain embodiments, the present invention provides methods for generating a microarray, comprising; a) providing; i) first and second unique species of capture reagents; ii) a first particle solution comprising a first population of encoded particles, iii) a second particle solution comprising a second population of encoded particles and iv) a substrate surface coated with a film; b) combining the first unique species of capture reagents with the first particle solution under conditions such that a first capture particle solution is generated; c) combining the second unique species of capture reagent with the second particle solution under conditions such that a second capture particle solution is generated; d) combining the first and second capture particle solutions to form a third capture particle solution; and e) spotting the third capture particle solution onto the film under conditions such that a plurality of capture-spots are formed on the film, thereby generating a microarray. In preferred embodiments, the first population of encoded particles contain a different label than the second population of encoded particles (e.g. such that the particles may be distinguished when combined).

In certain embodiments, the present invention provides methods of detecting a target molecule, comprising; a) providing; i) a microarray, wherein the microarray comprises a substrate surface coated with a film, wherein the film comprises a plurality of capture-spots, and wherein each of the capture-spots comprises a population of capture particles immobilized on the film, and ii) a test sample; and b) applying the test sample to the microarray; and c) detecting the presence or absence of a target molecule in the test sample. In certain embodiments, the applying of the test sample to the microarray comprises incubating the test sample with the microarray. In particular embodiments, the amount of time for incubating is no longer than 1 hour (e.g. no longer than 55 minutes, no longer than 45 minutes, no longer than 30 minutes, or no longer than 15 minutes). In preferred embodiments, the amount of time for incubation is less than 10 minutes (e.g. less than 9 minutes, 7 minutes, 5 minutes, 3 minutes, 2 minutes, or 1 minute). In some embodiments, the population of capture particles comprises at least two unique capture particle species (e.g. at least 3, at least 5, at least 10 or at least 100 unique capture particle species). In certain embodiments, the applying of the test sample to the microarray comprises flowing the sample over the microarray. In certain embodiments, the method further comprises a wash step prior to the detecting step. In particular embodiments, the microarray is configured for detecting a target molecule concentration in the test sample below $1.0 \times 10^{-6}$ moles per liter (i.e. the microarray is capable of detecting a target molecule concentration below $1.0 \times 10^{-6}$ moles per liter). In some embodiments, the microarray is configured for detecting a target molecule concentration below $1.0 \times 10^{-7}$ moles per liter, or below $1.0 \times 10^{-8}$ moles per liter, or below $1.0 \times 10^{9}$ moles per liter, or below $1.0 \times 10^{10}$ moles per liter, or below $1.0 \times 10^{-11}$, or below $1.0 \times 10^{-12}$ moles per liter. In preferred embodiments, the microarray is configured for detecting a target molecule concentration as low as $9.0 \times 10^{-11}$ moles per liter, or as low as $9.7 \times 10^{-11}$ moles per liter, or as low as about $9.8 \times 10^{-11}$ moles per liter. In particularly preferred embodiments, the microarray is configured for detecting a target molecule concentration as low as, or lower than $1.0 \times 10^{-12}$ moles per liter (e.g., $10 \times 10^{-15}$ or lower).

In some embodiments, the present invention provides a composition comprising a microarray, wherein the microarray comprises a substrate surface coated with a film, wherein the film comprises a plurality of capture-spots, and wherein each of the capture-spots comprises a population of capture particles immobilized on the film. In some embodiments, the population of capture particles comprises at least two unique capture particle species (e.g. at least 3, at least 5, at least 10 or at least 100 unique capture particle species). In particular embodiments, the composition further comprises a reaction chamber, wherein the microarray is housed within the reaction chamber. In some embodiments, the present invention provides a test device comprising a substrate with a surface, wherein at least a portion of the surface is coated with a film, wherein the film comprises a plurality of capture-spots, and wherein each of the capture-spots comprises a population of capture particles immobilized on the film. In further embodiments, the substrate is housed within a reaction chamber.

In some embodiments, the population of capture particles comprises at least two unique capture particle species (e.g. at least 3, at least 5, at least 10 or at least 100 unique capture particle species). In particular embodiments, the microarrays and test devices are configured for detecting a target molecule concentration in the test sample below $1.0 \times 10^{-6}$ moles per liter (i.e. the microarray is capable of detecting a target molecule concentration below $1.0 \times 10^{-6}$ moles per liter). In some embodiments, the microarrays and test devices are configured for detecting a target molecule concentration below $1.0 \times 10^{-7}$ moles per liter, or below $1.0 \times 10^{-8}$ moles per liter, or below $1.0 \times 10^{-9}$ moles per liter, or below $1.0 \times 10^{-10}$ moles per liter, or below $1.0 \times 10^{-11}$ moles per liter. In preferred embodiments, the microarrays and test devices is configured for detecting a target molecule concentration as low as $9.0 \times 10^{-11}$ moles per liter, or as low as $9.7 \times 10^{-11}$ moles per liter, or as low as about $9.8 \times 10^{-11}$ moles per liter or lower.

In certain embodiments, the present invention provides systems and kits comprising; i) a microarray, wherein the microarray comprises a substrate surface coated with a film, wherein the film comprises a plurality of capture-spots, and wherein each of the capture-spots comprises a population of capture particles immobilized on the film; and ii) at least one reaction component (e.g. secondary antibody, enzyme needed to carry out reaction, etc). In certain embodiments, reaction components include, but are not limited to, luminescent, electroluminescent, and enzyme labels. Examples of luminescent labels include acridinium esters. Examples of electroluminescent labels include ruthenium, tris-bippyridine and tripropylamine. Examples of enzyme labels include alkaline phosphatase, horseradish peroxidase, and beta-galactosidase. Examples of substrates for enzymes include chemiluminescent substrates (e.g., Tropix), fluorescent substrates (e.g., Attophos, JBL Scientific), and chromogenic substrates (e.g., BCIP, 5-bromo-4-chloro-3-indolyl phosphate, p-toluidine salt). In some embodiments, the population of capture particles comprises at least two unique capture particle species (e.g. at least 3, at least 5, at least 10 or at least 100 unique capture particle species). In some embodiments, the present invention provides systems and kits comprising; i) a capture particle solution comprising a population of capture particles, and ii) a substrate with a surface, wherein at least a portion of the surface is coated with a film. In other embodiments, the present invention provides kits and systems comprising; i) capture reagents; ii) a particle solution comprising a population of particles; and iii) a substrate surface coated with a film. In further embodiments, the kits and systems further comprise instructions for using microarrays and test devices.

In certain embodiments, the density of the capture-spots on the film is at least 800 per cm$^2$ (e.g. at least 1000, or at least 1200, or at least 1400). In some embodiments, the density of the capture-spots on the film is at least 1600 per cm$^2$ (e.g. a distance of 250 μm between the centers of the capture-spots, would allow 4 capture-spots per mm, and 40 capture-spots per cm, resulting in 1600 capture-spots per cm$^2$). In some embodiments, the total area of each capture-spot is less than $3 \times 10^4$ m$^2$.

DEFINITIONS

Figure 1:
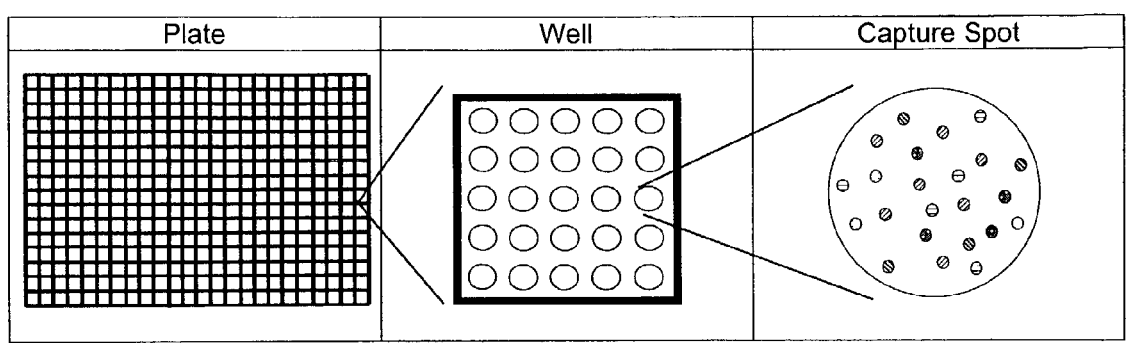
FIG. 1A shows an exemplary format for the film-immobilized capture particles of the present invention where the substrate is a 384-well plate and each well contains multiple capture-spots.
FIG. 1B shows a poisson distribution that may be employed to determine the probability of omitting any particular species of capture particle from a capture-spot based on the number of replicates (copies) of the capture particle.
Figure 1:
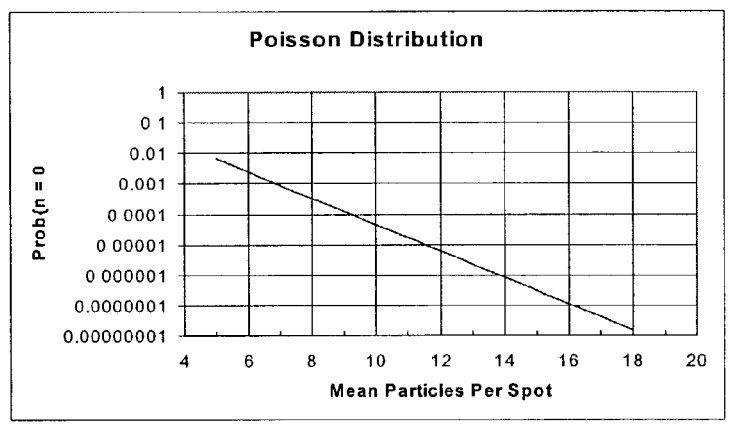

To facilitate an understanding of the invention, a number of terms are defined below.

As used herein, the term "particle" refers to small particles (e.g. micrometer range) that effectively serve as a solid support or solid phase for chemical reactions (e.g. capture reagent binding to a target) that may be immobilized on a film. Even though particles can be of any size, the preferred size is 0.001–500 μm, more preferably 0.01–10 μm, even more preferably 0.5–5.0 μm, and most preferably approximately 1.0 μm in diameter (or approximately 1 μm$^2$ in total area). The particles may be uniform (e.g., being about the same size) or of variable size. Particles may be any shape, but are preferably made of regularly shaped material (e.g. spherical).

As used herein, the term "capture particle" refers to a particle that has a capture reagent attached to its surface. A capture reagent is "attached" to a particle when it is associated with the particle through a non-random chemical or physical interaction. In some preferred embodiments, the attachment is through a covalent bond. However, attachments need not be covalent or permanent. Exemplary attachment methods are provided in U.S. Pat. No. 5,858,653 to Duran et al., herein incorporated by reference. In certain embodiments, particles are coated with capture reagents. In some embodiments, capture reagents are attached to a particle through a "spacer molecule" or "linker group." Such spacer molecules are molecules that have a first portion that attaches to the capture reagent and a second portion that attaches to the particle. Thus, when attached to the particle, the spacer molecule separates the particle and the capture reagent, but is attached to both.

As used herein, the term "capture reagent" refers to molecules that may be attached to the surface of a particle (directly or through a linker) that are capable of binding a target molecule. Examples of capture reagents include, but are not limited to, an antibody (both monoclonal and polyclonal), a receptor, a hapten, an enzyme, a protein, a peptide, a nucleic acid, a drug, a hormone, a chemical, a polymer, a pathogen, a toxin, or combinations thereof.

As used herein, the term "film" refers to any substance capable of coating at least a portion of a substrate surface and immobilizing capture particles. Examples of materials used to make films include, but are not limited to, agarose, acrylamide, SEPHADEX, proteins (e.g. bovine serum albumin (BSA), polylysine, collagen, etc.), hydrogels (e.g. polyethylene oxide, polyvinyl alcohol, polyhydroxyl butylate, etc.), film forming latexes (e.g. methyl and ethyl aerylates, vinylidine chloride, and copolymers thereof), or mixtures thererof. In certain embodiments, the films include additional material such as plasticisers (e.g. polyethylene glycol [PEG], detergents, etc.) to improve stability and/or performance of the film. In preferred embodiments, the film is a material that will react with the capture particles and present them in the same focal plane. In other preferred embodiments, the film is pre-activated with cross-linking groups such as aldehydes, or groups added after the film has been formed.

As used herein, the term "substrate" refers to any material with a surface that may be coated with a film.

As used herein, the phrase "coated with a film" in regard to a substrate refers to a situation where at least a portion of a substrate surface has a film attached to it (e.g. through covalent or non-covalent attachment).

As used herein, the term "particle solution" refers to a mixture containing particles in a liquid (e.g. buffer solution, such as phosphate buffered saline). In particular embodiments, the solution also contains a non-ionic surfactant (e.g., polyoxyethylene-sorbitan monolaurate), as well as glycerol, ethylene glycol, propylene glycol, trehalose, or sucrose.

As used herein, the term "capture particle solution" refers to a mixture containing capture particles in a liquid (e.g. buffer solution, such as phosphate buffered saline). In particular embodiments, the solution also contains a non-ionic surfactant (e.g., polyoxyethylenesorbitan monolaurate), as well as glycerol, ethylene glycol, propylene glycol, trehalose, or sucrose.

As used herein, the term "capture-spot" refers to the discreet area formed on a film containing a population of capture particles, or a single capture particle, immobilized on a film. A capture-spot may be formed on a film, for example, when a discreet volume of capture particle solution is applied to a film by a transfer means (e.g. pin spotting tool, inkjet printer, etc.). As used herein, the phrase "plurality of capture-spots" refers to at least two capture-spots (e.g. 2, 10, 100, or 1000 capture spots) on a film.

As used herein, the term "spotting" refers to the application of a discreet volume of capture particle solution to a film employing a transfer means such as a pin spotting tool or ink-jet printer, or other transfer means.

As used herein, the term "microarray" refers a composition comprising a substrate surface coated with a film, wherein the film comprises a plurality of capture-spots, and wherein each of the capture-spots comprises a population of capture particles, or a single capture particle, immobilized on the film.

As used herein, the term "test device" refers to a device comprising a substrate with a surface, wherein at least a portion of the surface is coated with a film, wherein the film comprises a plurality of capture-spots, and wherein each of the capture-spots comprises a population of capture particles, or a single capture particle, immobilized on the film.

As used herein, the term "target molecule" refers to a molecule in a sample to be detected. Examples of target molecules include, but are not limited to, oligonucleotides (e.g. containing a particular single nucleotide polymorphism [SNP]), viruses, antibodies, naturally occurring drugs, synthetic drugs, pollutants, allergens, effector molecules, growth factors, chemokines, cytokines, and lymphokines.

The term "sample" as used herein is used in its broadest sense and includes, but is not limited to, environmental, industrial, and biological samples. Environmental samples include material from the environment such as soil and water. Industrial samples include products or waste generated during a manufacturing process. Biological samples may be animal, including, human, fluid (e.g., blood, plasma and serum), solid (e.g., stool), tissue, liquid foods (e.g., milk), and solid foods (e.g., vegetables).

As used herein, the term "test sample" refers to any type of sample (e.g. environmental, industrial, biological, etc.) that is suspected of containing a target molecule.

As used herein, the phrase "target molecule concentration" refers to the concentration of target molecule in a sample (e.g. moles per liter).

As used herein, the phrase "reaction component" refers to the various type of molecules and solutions (e.g. buffer solutions) that are generally employed in a detection assay. For example, in an immunoassay, typical reaction components include a primary and secondary antibody, and an enzyme used to generate signal when contacting a substrate attached to an antibody. In another example, for the INVADER assay, typical reaction components include an INVADER oligonucleotide, a primary probe, a control target, and a structure-specific enzyme.

The term "signal" as used herein refers to any detectable effect, such as would be caused or provided by a label or an assay reaction.

As used herein, the terms "subject" and "patient" refer to any animal, such as a mammal like a dog, cat, bird, livestock, and preferably a human. In preferred embodiments, a subject or patient is the source of a test sample.

The term "test compound" or "candidate compound" refer to any chemical entity, pharmaceutical, drug, and the like that is evaluated, for likely ability to treat or prevent a disease, illness, sickness, or disorder of bodily function, or otherwise alter the physiological or cellular status of a sample. Test compounds comprise both known and potential therapeutic compounds. A test compound can be determined to be therapeutic by screening using the screening methods and compositions of the present invention.

As used herein, the term "unique species of capture reagent" refers to a type of capture reagent that is different from another type of capture reagent. For example, a first species of capture reagent that is an antibody is different from a second species of capture reagent that is an oligonucleotide.

As used herein, the term "unique capture particle species" refers to one type of capture particle that has a unique species of capture reagents attached to its surface as compared to second type of capture particle that does not have that capture reagents on its surface.

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), and magnetic tape.

As used herein, the terms "computer processor" and "central processing unit" or "CPU" are used interchangeably and refers to a device that is able to read a program from a computer memory (e.g., ROM or other computer memory) and perform a set of steps according to the program.

GENERAL DESCRIPTION OF THE INVENTION

The present invention relates to film-immobilized capture particles, and substrates coated with film-immobilized capture particles. Specifically, the present invention provides microarrays for detecting the presence or absence of a target molecule in a sample employing film-immobilized capture particles. In preferred embodiments, the microarrays of the present invention comprise capture particles and at least a portion of a substrate coated with a film, wherein the capture particles are immobilized on the film. In certain embodiments, capture-spots are formed on the film of the microarray, wherein the capture-spots comprise film-immobilized capture particles. In preferred embodiments, the present invention provides very high density microarrays that allow simultaneous analysis, (e.g. parallel rather than serial processing), of a number of samples. This is accomplished, for example, by forming an "array of arrays" (e.g. a composite array comprising a plurality of individual arrays, that is configured to allow processing of multiple samples). For example, each individual array may be present within each well of a microtiter plate, or within a single capture spot. Therefore, the present invention allows a very high number of assays to be run simultaneously.

In preferred embodiments, particles are pre-coated with specific capture reagents, to form capture particles, before being deposited on a film. In this regard, many points of attachment are provided on the capture particles. In other preferred embodiments, cross-linking groups on the film react with the capture reagent, overcoat, or other molecules pre-attached to the particles. In particularly preferred embodiments, capture particles are encoded such that many unique species of capture particles can be immobilized in the same spot (e.g. allowing the detection of multiple target molecules in a single capture-spot). In certain embodiments, a reaction chamber is fabricated which incorporates the microarray in a sealed or controlled environment. Preferably, solutions of target molecules, secondary labeling reagents, or washes are then brought into contact with the microarray. As a result, targets (e.g. labeled targets) are bound to capture particles, allowing the identity of the target to be determined (e.g. from the position of the capture particle on the film coated substrate or integral codes in the particles). In certain embodiments, using an optical system, capture particles are located, identified, and the levels of attached labels measured (e.g. the amount of bound target is determined).

The present invention has performance advantages over existing approaches. For example, the solid phases (e.g., capture particles) and coating conditions can be optimized for each different capture reagent. Also, particles are available with numerous surfaces, and capture reagents can be attached in bulk suspensions which can have a wide range of buffers, pHs, ionic strengths, and so forth. This improves the density, kinetic rate constant, and equilibrium affinity constant of the capture reagent. Nonspecific binding can also be reduced, for example, because the capture reagents may be attached with minimal changes to their binding sites and the surface of the film can be overcoated with blockers.

Capture reagents for many tests can be attached to the solid phase particles in bulk and tested before they are placed on a film coated substrate (e.g. planar substrate). This can, for example, improve between-device variability, reduce quality control testing, and lower manufacturing costs. Also, since spotting volume and ambient conditions are not as critical when capture reagents are delivered pre-attached to particles, fabrication of devices is accelerated and costs reduced. Furthermore, with pre-tested capture particles and manufacturing test equipment that can detect their presence in the device, the quality of the final product is improved.

The film-immobilized capture particles of the present invention also provide increased sensitivity and reduced incubation times. For example, because a capture zone is generally defined by the surface of the particle instead of the volume of spotting solution or the photolithography mask, the density of arrays can be greatly increased employing the methods and compositions of the present invention. Furthermore, small capture zones improve the reaction kinetics as a depletion region or concentration boundary layer is less likely to develop. Consequently, signal intensity is increased because the labels are concentrated into a smaller area. The film-immobilized capture particles of the present invention also improve detection by making it easier to locate and focus on the capture zones.

DETAILED DESCRIPTION OF THE INVENTION

The detailed description of the invention is provided below is the following sections: I) Capture particles; II) Substrates, Films, and Microarrays; III) Immobilizing Capture particles on Films; IV) Capture-Spot Size and Density; V) Reaction Chambers, Kits, and Systems; VI) Detection Assays; and VII) Detecting Targets.

I. Capture Particles

The present invention employs capture particles immobilized on a film. The capture particles comprise particles and capture reagents. The particles may be any particles capable of being immobilized in a film. In general, the term "particle" refers to small particles (e.g. micrometer range) that effectively serve as a solid support or solid phase for chemical reactions (e.g. capture reagent binding to target). Even though particles can be of any size, the preferred size is 0.001–500 µm, more preferably 0.01–10 µm, even more preferably 0.5–5.0 µm, and most preferably approximately 1.0 µm. The particles may be uniform (e.g., being about the same size) or of variable size (e.g., such that the differences can be determined by size-dependent properties such as light scattering or optical refraction). Particles may be any shape. Preferably, the particles are made of regularly shaped material. The preferred shape is spherical, however, particles of any other shape can be employed.

The particles of the present invention may be made of any type of material. For example, the particles may be made of polystyrene or latex, other polymeric materials. Other examples of material used to construct particles includes, but are not limited to, polymers such as carbohydrate-based polymers, polyaliphatic alcohols, poly(vinyl)polymers, polyacrylic acids, polyorganic acids, polyamino acids, co-polymers, block co-polymers, tertpolymers, polyethers, naturally occurring polymers, polyimids, surfactants, polyesters, branched polymers, cyclo-polymers, polyaldehydes, brominated polystyrene, polyacrylic acid, polyacrylonitrile, polyamide, polyacrylamide, polyacrolein, polybutadiene, polycaprolactone, polyester, polyethylene, polyethylene terephthalate, polydimethylsiloxane, polyisoprene, polyurethane, polyvinylacetate, polyvinylchloride, polyvinylpyridine, polyvinylbenzylchloride, polyvinyltoluene, polyvinylidene chloride, polydivinylbenzene, polymethylmethacrylate, polylactide, polyglycolide, poly(lactide-co-glycolide), polyanhydride, polyorthoester, polyphosphazene, polyphosophaze, or combinations thereof. Representative combination polymers include, but are not limited to, particles composed of poly-(styrene-co-vinylbenzyl chloride-co-acrylic acid) (85:10:5 molar ratio); poly(styrene-co-acrylic acid) (99:1 molar ratio); poly(styrene-co-methacrylic acid) (90:10 molar ratio); poly(styrene-co-acrylic acid-co-m & p-divinylbenzene) (89:10:1 molar ratio); poly-(styrene-co-2-carboxyethyl acrylate) (90:10 molar ratio); poly(methyl methacrylate-co-acrylic acid) (70:30 molar ratio); and poly(styrene-co-butyl acrylate-co-methacrylic acid) (45:45:10 weight ratio).

Many particles are available commercially. For example particles formed from synthetic polymers such as polystyrene, polyacrylamide, polyacrylate, or latex are now commercially available from numerous sources such as Bio-Rad Laboratories (Richmond, Calif.), Bangs Laboratories (Fishers, Ind.), LKB Produkter (Stockholm, Sweden), and Spherotech, Inc. (Libertyville, Ill.). Particles formed from natural macromolecules and particles such as agarose, crosslinked agarose, globulin, deoxyribose nucleic acid, and liposomes are commercially available from sources such as Bio-Rad Laboratories, Pharmacia (Piscataway, N.J.), and IBF (France). Also, particles formed from copolymers of polyacrylamide and agarose are commercially available from sources such as IBF and Pharmacia.

In some embodiments, the particles of the present invention further include magnetic materials (e.g., magnetically responsive metal oxide, such as superparamagnetic, paramagnetic, and ferromagnetic metal oxide). Magnetic particles are commercially available from sources such as Dynal Inc. (Great Neck, N.Y.) or can be prepared using methods known in the art (e.g., U.S. Pat. No. 5,356,713, hereby incorporated by reference). Other materials may be used to make the particles of the present invention such as, for example, carbohydrates (e.g., carboxymethyl cellulose, hydroxyethyl cellulose), polypeptides, eukaryotic and prokaryotic cells, viruses, lipids, metals, resins, rubber, silica, and silicone (e.g., polydimethyldiphenyl siloxane, glass, ceramic, etc.). In some embodiments, the particles contain a cross-linking agent (e.g., approximately 0% to 70% of a cross-linking agent). Cross-linking agents that may be employed include, but are not limited to, divinyl benzene, ethylene glycol dimethacrylate, trimethylol propane trimethacrylate, or N,N'methylene-bis-acrylamide or other functionally equivalent agents known in the art. Crosslinking of carbohydrate polymer, such as hydroxypropyl cellulose, may be achieved with adipic acid, sebacic acid, succinic acid, citric acid, 1,2,3,4-butanetetracarboxylic acid, or 1,10 decanedicarboxylic acid. In certain embodiments the particles of the present invention are made of polystyrene and contain about 0% to 30% divinyl benzene.

In certain embodiments, the particles of the present invention have one or more different types of functional groups on their surface (e.g., carboxyl, amino, or other groups on their surface) to facilitate the attachment and bonding (e.g. attachment of particles to a film). Examples of functional groups on the surface of the particles include, but are not limited to carboxylates, esters, alcohols, carbamides, aldehydes, amines, 5-Br-U, 5-Br-dA (or dG, dC, dT, or photo-crosslinked), biotin-dT (dG, dC, dA, dU), thio-dT (dG, dC, dA, dU), sulfur oxides, nitrogen oxides, and halides. An example of a carboxylated latex particle is described in U.S. Pat. No. 4,181,636 (herein incorporated by reference). Also, the surface of many commercially available polystyrene particles have been modified with carboxyl, amino, hydroxyl, hydrazide, amide, chloromethyl, epoxy, aldehyde and tosyl groups, which can be used for passive and covalent coupling techniques. In certain embodiments, capture reagents (e.g. antibody, oligonucleotide, etc) are covalently coupled to activated heterobifunctional cross-linkers through amines, carboxylates, sulfhydryls, or carbohydrates on the surface of the capture reagent. In addition, various types of protein-coated particles are commercially available.

Any type of attachment procedure may be used to add functional groups to the surface of the particles of the present invention, including covalent and non-covalent (e.g., hydrophobic interactions, hydrophilic interactions, ionic interactions, van der waals interactions) attachments. For example, adsorption (e.g. to add carboxy or amino groups), covalent linkage (e.g. to add carboxy, amino, aldehyde, or hydrazine groups), or affinity linkage (e.g. streptavidin, protein A, or antibody coated particles). Further, spacer groups may be employed, for example, to position the functional group away from the particle surface. In one example, TENTAGEL microspheres (Sigma-Aldrich) may be employed for covalent coupling as they contain PEG spacer groups that position the reactive chemical groups away from the particle surface.

In preferred embodiments, particles have capture reagents attached to their surface (e.g. for binding target molecules). As used in the present application, particles with capture reagents attached to their surface are termed "capture particles." Preferably, capture particles are formed by attaching particles with capture reagents before being deposited on a film. Any capture reagent may be employed. For example, particles may be precoated with streptavidin, protein A, anti-biotin, or anti-Fc antibodies. Preferably, the capture reagents are capable of binding target molecules, including, but not limited to, an antibody (both monoclonal and polyclonal), a receptor, a hapten, an enzyme, a protein, a peptide, a nucleic acid, a drug, a hormone, a chemical, a polymer, a pathogen, a toxin, or combinations thereof. In preferred embodiments of the present invention, each capture particle is capable of capturing at least 10,000 targets, more preferably at least 15,000 targets, and most preferably at least 20,000 targets.

Preferably, capture reagents bind a cognate ligand (target). Examples of binding pairs of capture reagents and targets useful in the present invention, in which either member may be the capture reagent on the particle and the other member the target molecule, include for example, antigen and specific antibody; hormone and hormone receptor; polynucleotide and complementary polynucleotide; polynucleotide and polynucleotide binding protein; biotin and avidin or streptavidin; enzyme and enzyme cofactor; receptor and ligand, lectin and specific carbohydrate; and hapten and anti-hapten. The haptens may include, for example, naturally occurring hormones, naturally occurring drugs, synthetic drugs, pollutants, allergens, effector molecules, growth factors, chemokines, cytokines, lymphokines, amino acids, oligopeptides, chemical intermediates, nucleotides, oligonucleotides or the like. The use for such compounds may be, for example, in the detection of drugs of abuse, therapeutic dosage monitoring, health status, donor matching for transplantation purposes, pregnancy (e.g., hCG or alpha-fetoprotein), detection of disease, e.g. endotoxins, cancer antigens, pathogens, and the like. Therapeutic drugs may include, but are not limited to, anti-AIDS substances, anti-cancer substances, antibiotics, anti-viral substances, enzyme inhibitors, neurotoxins, opioids, hypnotics, antihistamines, tranquilizers, anticonvulsants, muscle relaxants and anti-Parkinson substances, anti-spasmotics and muscle contractants, miotics and anti-cholinergics, immunosuppressants (e.g. cyclosporine) anti-glaucoma solutes, antiparasite and/or anti-protozoal solutes, anti-hypertensives, analgesics, anti-pyretics and antiinflammatory agents (such as NSAID's), local anesthetics, ophthalmics, prostaglandins, antidepressants, anti-psychotic substances, anti-emetics, imaging agents, specific targeting agents, neurotransmitters, proteins and cell response modifiers.

Proteins (e.g. as capture reagent) may be employed, for example, in a wide variety of diagnostics, such as detecting cell populations, blood type, pathogens, immune responses to pathogens, immune complexes, saccharides, lectins, naturally occurring receptors, and the like. Receptors may find use in binding to haptens, proteins, other receptors, or the like, or detection of the presence of pathogens, the level of a particular protein in a physiological fluid, the presence of haptens in a wide variety of samples, such as physiological fluids, air, process streams, water, etc. Nucleic acids may also find use in the detection of complementary strands, proteins specifically binding to nucleic acids, and the like. Section VI below contains a further description of detection assays and target molecules. The capture reagents (or targets) may also be a reporter molecules (e.g., fluorescent) capable of reacting with a variety of inorganic analytes that define properties of biological fluids, air, water, and the like, e.g., $O_2$, $CO_2$, pH, $Ca++$, $Na+$, $K+$, or $Cl-$ as disclosed for example in U.S. Pat. No. 5,747,349, herein incorporated by reference.

In preferred embodiments, capture reagents are coated on particles before the particles are deposited on a film. In this regard, the present invention provides a great deal of flexibility as different capture reagents can be coated on whatever type of particle is best for that capture reagent (e.g. prior to taking extra steps of immobilizing the capture particles on a film). For example, particles coated with protein A may be selected for preparation of an array of antibody probes, while covalent attachment to carboxyl particles may be more appropriate for an array of peptide probes. Also, a number of different attachment procedures might be applied for a single capture reagent to increase the probability that important conformational features are retained on the solid phase particle. For example, a protein to be arrayed on a particle might be adsorbed onto carboxyl microspheres, amino microspheres, and unmodified polystyrene microspheres, and the most suitable type of capture particle selected for further work.

In certain embodiments, capture particles are treated with an overcoat to block any additional reactive groups on the capture particles. For example, the capture particles may be treated with a blocking agents such as $NaCNBH_3$, bovine serum albumin (BSA), ethanolamine, casein, or blockers from Shearwater Corp. (Huntsville, Ala.), such as mPEG-amine, mPEG-NHS, mPEG-succinimidyl propionate/butanoate, and mPEG-aldehyde.

In certain embodiments, the various species of capture particles of the present invention may be distinguished from one another. In certain embodiments, the size and/or shape of the capture particles may be used to distinguish various species of capture particles. In preferred embodiments, the capture particles of the present invention are encoded with detectable labels in order to differentiate between different species (See, e.g., WO9853093, incorporated herein for all purposes). For example, particles may be encoded internally with a detectable label (e.g., fluorescent label), or encoding labels may be attached to the surface of the particle. In certain embodiments, the capture particles are labeled with quantum dots (See, e.g. Chan et al., Curr Opin Biotechnol February 2002;13(1):40–6, herein incorporated by reference). For example, latex beads filled with several colors of nanoscale semiconductors known as quantum dots can serve as a unique label for the capture particle. In this regard, capture particle solutions with many different species of capture particles may be used to form capture-spots on a film since each species of capture particle may be identified by a unique code. As such, a complete array may be formed in a single capture-spot.

In certain embodiments, the number of differently labeled capture particles per capture-spot (e.g. spots deposited on the film) is at least one, preferably at least two. In preferred embodiments, there is at least 5, at least 10, at least 100, or at least 1000 differently labeled capture particles per capture zone. In general, the density of unique species of capture -particles in an array is able to be increased with increasing numbers of differently labeled particles. Several methods have been developed to encode particles, including fluorescent identifiers (e.g., U.S. Pat. No. 5,786,219 to Zhang et al., herein incorporated by reference for all purposes) and scattering identifiers (RLS PARTICLES, Genicon Sciences Corp.).

In preferred embodiments, the capture particles of the present invention are encoded with fluorescent compounds. One advantage of a fluorescence code is that it can be read by the same optical system that measures a fluorescently labeled target. In other embodiments, light scatter may be used to identify capture particles by attaching gold or silver nanospheres to the particles.

In some embodiments, the capture particles are encoded with dyes. Any type of dye may be employed. In certain embodiments, dyes that are fluorescent are used to encode the capture particles of the present invention. Preferably such dyes are hydrophobic and are capable of staining polymeric particles (e.g. Nile Red, Nile Blue, etc). In certain embodiments, fluorescent bases are incorporated into oligonucleotides (serving as a capture reagent). In certain embodiments, the dyes have light emission at a wave-length in the ultra-violet or visible range. In other embodiments, the dyes fluoresce in the infrared or near infrared region. In particular embodiments, dyes with light emission at a wave-length of greater than about 450 nm, preferably greater than about 480 nm, more preferably at greater than about 500 nm are used to encode the capture particles. Preferred dyes include cyanine dyes or Alexa.

Preferably, when more than one dye is used to stain more than one sub-population of capture particles, these dyes are chosen such that they possess substantially different emission spectra, preferably having emission maxima separated by greater than 10 nm, more preferably having emission maxima separated by greater than 25 nm, even more preferably separated by greater than 50 nm. Dyes can be selected to have emission maxima that match commercially available filters, or for detecting multiple fluorophores; each fluorophore having a specific emission maxima.

Particularly useful fluorescent dyes that may be employed are of the general class known as cyanine dyes, with emission wavelengths between 550 nm and 900 nm. These dyes may contain methine groups and their number typically influences the spectral properties of the dye. The monomethine dyes that are pyridines typically have blue to blue-green fluorescence emission, while quinolines have green to yellow-green fluorescence emission. The trimethine dye analogs are substantially shifted toward red wavelengths, and the pentamethine dyes are shifted even further, often exhibiting infrared fluorescence emission (see, for example, U.S. Pat. No. 5,760,201, herein incorporated by reference).

In addition to fluorescent dyes used in the present invention, related dyes can be employed such as cyclobutenedione derivatives, substituted cephalosporin compounds, fluorinated squaraine compositions, symmetrical and unsymmetrical squaraines, alkylalkoxy squaraines, or squarylium compounds. In addition to squaraines (derived from squaric acid), hydrophobic dyes such as phthalocyanines and naphthalocyanines can also be selected to operate at longer wavelengths. Other classes of fluorochromes are equally suitable for use as dyes according to the present invention. Examples of such dyes include, but are not limited to: 3-Hydroxypyrene 5,8,10-Tri Sulfonic acid, 5-Hydroxy Tryptamine, 5-Hydroxy Tryptamine (5-HT), Acid Fuhsin, Acridine Orange, Acridine Red, Acridine Yellow, Acriflavin, AFA (Acriflavin Feulgen SITSA), Alizarin Complexon, Alizarin Red, Allophycocyanin, ACMA, Aminoactinomycin D, Aminocoumarin, Anthroyl Stearate, Aryl- or Heteroaryl-substituted Polyolefin, Astrazon Brilliant Red 4G, Astrazon Orange R, Astrazon Red 6B, Astrazon Yellow 7 GLL, Atabrine, Auramine, Aurophosphine, Aurophosphine G, BAO 9 (Bisaminophenyloxadiazole), BCECF, Berberine Sulphate, Bisbenzamide, BOBO 1, Blancophor FFG Solution, Blancophor SV, Bodipy Fl, BOPRO 1, Brilliant Sulphoflavin FF, Calcien Blue, Calcium Green, Calcofluor RW Solution, Calcofluor White, Calcophor White ABT Solution, DiIC (indodicarbocyanine), TRC (Texas Red cadaverine), Calcophor White Standard Solution, Carbocyanine, Carbostyryl, Cascade Blue, Cascade Yellow, Catecholamine, Chinacrine, Coriphosphine O, Coumarin, Coumarin-Phalloidin, CY3.18, CY5.18, CY7, Dans (1-Dimethyl Amino Naphaline 5 Sulphonic Acid), Dansa (Diamino Naphtyl Sulphonic Acid), Dansyl NH—CH3, DAPI, Diamino Phenyl Oxydiazole (DAO), Dimethylamino-5-Sulphonic acid, Dipyrrometheneboron Difluoride, Diphenyl Brilliant Flavine 7GFF, Dopamine, Eosin, Erythrosin ITC, Ethidium Bromide, Euchrysin, FIF (Formaldehyde Induced Fluorescence), Flazo Orange, Fluo 3, Fluorescamine, Fura-2, Genacryl Brilliant Red B, Genacryl Brilliant Yellow 10GF, Genacryl Pink 3G, Genacryl Yellow SGF, Gloxalic Acid, Granular Blue, Haematoporphyrin, Hoechst 33258, Indo-1, Intrawhite Cf Liquid, Leucophor PAF, Leucophor SF, Leucophor WS, Lissamine Rhodamine B200 (RD200), Lucifer Yellow CH, Lucifer Yellow VS, Magdala Red, Marina Blue, Maxilon Brilliant Flavin 10 GFF, Maxilon Brilliant Flavin 8 GFF, MPS (Methyl Green Pyronine Stilbene), Mithramycin, NBD Amine, Nile Red, Nitrobenzoxadidole, Noradrenaline, Nuclear Fast Red, Nuclear Yellow, derivatives of dipyrrometheneborondifluoride, dibenzopyrometheneboronedifluoride dyes, energy tranfer conjugates, dyes in U.S. Pat. No. 5,573,909 (hereby incorporated by reference), and Nylosan Brill.

To differentiate between different dyes using instrumental methods, for example, a variety of filters and diffraction gratings may be employed (e.g. to allow the respective emission maxima to be independently detected). When two dyes are selected that possess similar emission maxima, instrumental discrimination can be enhanced by insuring that both dyes' emission spectra have similar integrated amplitudes, similar bandwidths, and by insuring that the instrumental system's optical throughput is equivalent across the emission range of the two dyes. Instrumental discrimination can also be enhanced by selecting dyes with narrow bandwidths rather than broad bandwidths. Useful detection methods are provided in WO9853093, hereby incorporated by reference.

Fluorescent staining of particles may be achieved by any of the technique known in the art. Three examples of making fluorescent particles include: (i) covalent attachment of dyes onto the surface of the particle (e.g. U.S. Pat. No. 5,194,300 Cheung, herein incorporated by reference), (ii) internal incorporation of dyes during particle polymerization (e.g., U.S. Pat. No. 5,073,498 Schwartz, herein incorporated by reference), and (iii) dyeing after the particle has already been polymerized.

Any fluorescence detection system (including visual inspection) can be used to detect differences in spectral properties between dyes (see section VII below), with differing levels of sensitivity. Such differences include, but are not limited to, a difference in excitation maxima, a difference in emission maxima, a difference in fluorescence lifetimes, a difference in fluorescence emission intensity at the same excitation wavelength or at a different wavelength, a difference in absorptivity, a difference in fluorescence polarization, a difference in fluorescence enhancement in combination with target materials, or combinations thereof.

In certain embodiments, the present invention employs nanospheres to encode the capture particles (See, e.g., PCT publication WO0113120, incorporated by reference for all purposes). One or more types of labeled nanoparticles may be attached to the surface of the particles of the present invention as an encoding technique. Nanospheres may be labelled (encoded) in the same manners as the particles of the present invention (see above). In preferred embodiments, the nanospheres are labelled with dyes.

Any type of method for labeling capture particles with nanospheres may be employed. For example, all nanospheres in a given population may be dyed with the same concentration of a dye, and by coupling a known quantity of these nanospheres to the capture particles, along with known quantities of other nanospheres stained with different dyes, a multifluorescent capture particle results. By varying the quantity and ratio of different populations of nanospheres it is possible to establish and distinguish a large number of discreet populations of capture particles with unique emission spectra. The capture particles themselves can also be stained (see above) to provide an additional color or signal. Any type of nanosphere may be employed. Nanospheres are commercially available in sizes ranging from about 10 nanometers (nm) to about 100,000 nm in diameter. Preferred diameters are within about 10 and 1,000 nm, preferably within 200 and 500 nm.

In certain embodiments of the present invention, the particles comprise dendrimers (e.g. detectably labelled dendrimers). Dendrimeric polymers have been described extensively (See, Tomalia, Advanced Materials 6:529 [1994]; Angew, Chem. Int. Ed. Engl., 29:138 [1990]; incorporated herein by reference in their entireties). Dendrimers polymers are synthesized as defined spherical structures typically ranging from 1 to 20 nanometers in diameter. Molecular weight and the number of terminal groups increase exponentially as a function of generation (the number of layers) of the polymer. Different types of dendrimers can be synthesized based on the core structure that initiates the polymerization process. Any type of detectable label may be incorporated into dendrimers such that, when attached to the particles of the present invention, the label is detectable. Examples of particular dendrimers include, but are not limited to, 3DNA dendrimers manufactured by Genisphere Inc. (Montvale, N.J.).

In some embodiments, the particles and capture particles of the present invention are part of a particle solution or capture particle solution. In certain embodiments, the particles of the present invention are mixed with phosphate buffered saline (PBS) (or other buffers), with a pH approximately 7–8. Other useful buffers include, but are not limited to, carbonate (pH 8–10), borate (pH 8–10), MES (pH 6–7), MOPS (pH 6.5–8), Tris (pH 7–9), CHES (10), CAPS (pH 9.5–11), any "Good" buffer (Good et al., *Biochemistry*, 5:467, 1966, hereby incorporated by reference), saline sodium citrate (pH approximately 7.0), potassium carbonate (pH approximately 11) or potassium tetraborate (pH approximately 12), boric acid or sodium hydroxide (pH approximately 10), sodium acetate, potassium hydrogen phthalate sodium hydroxide (pH approximately 5), dihydrogen potassium phosphate sodium hydroxide (pH approximately 6). In particular embodiments, the solutions also contains detergents including, but not limited to, non-ionic detergents such as polyoxyethylenesorbitan monolaurate, Triton X-100, Brij 30/35 (0.01–1%), NP-40, and zqitterionic detergents such as CHAPS, CHAPSO, and Anionic detergents such as lauryl sufates, SDS, LDS, and Cationic detergents such as cetylpridinium chloride. Solutions may also contain protectants (e.g. preserve reactivity upon drying) such as trehalose, sucrose, and glycine betamine. Particle and capture particle solutions may also contain additional reagents such as, for example, glycerol, ethylene glycol, propylene glycol, trehalose, or sucrose. In preferred embodiments, capture particle solutions are employed that prevent evaporation of liquid during spotting and preserve capture reagent (e.g. protein) conformation.

For capture particles solutions, the concentration of capture particles will, in general, depend on the capabilities of the spotting technology. Standard fluid handling devices are capable of handling particle concentrations up to about 1 or 2% w/v for particles in the 1–5 μm range. In preferred embodiments, the concentration of each species of capture particles in a solution is such that, when spotted on a film, a 500 μm$^2$ diameter capture-spot contains approximately 100–200 capture particles of each species.

In preferred embodiments, capture particle solutions are prepared by pooling subsets of distinctly labeled subpools of capture particles such that the capture particle solution contains many different populations (i.e. unique species) of capture particles. In this regard, multiplex analysis may be carried out. The encoding procedures described above, for example, may be employed to label each subpool of particles. Methods for generating pooled solutions of particles for multiplex analysis are described, for example, in U.S. Pat. No. 5,981,180 to Chandler et al., which is incorporated herein by reference for all purposes.

Reference particles incorporating fluorescent dyes can also be mixed in with the capture particles to assist in determining signal levels or locating spots. Also, filler particles with no capture reagents on their surface or no internal dye can be added to the capture particle solutions to aid in dispersing the capture particles and locating capture-spots.

II. Substrates, Films, and Microarrays

The present invention provides microarrays comprising capture particles immobilized on a film coated substrate surface. Any type of substrate or substrate surface may be coated with a film. For example, suitable substrates or substrate surfaces include, but are not limited to, glass and modified or functionalized glass, plastics (including acrylics, polystyrene and copolymers of styrene and other materials, polypropylene, polyethylene, polybutylene, polyurethanes, TeflonJ, etc.), polysaccharides, nylon or nitrocellulose, resins, silica or silica-based materials including silicon and modified silicon, fused silica, carbon, metals, inorganic glassess, polycarbonate, polystyrene, fiber-optic arrays, or acrylic, textured and porous materials, such as gels, rubbers, polymers, and other non-rigid materials, or any material which has an acceptably low background and will adhere the film. Examples of particular substrates that are sealed from the outside environment are provided in U.S. Pat. Nos. 6,126,899 and 6,124,138 to Woudenberg et al., both of which are hereby incorporated by reference.

In general, the suitable substrates allow optical detection and do not themselves fluoresce in an interfering manner (e.g. if the substrate fluoresces, it emits wavelengths outside the range relevant for a given assay). The surface of a substrate can be coated with molecules such as, for example, aminosilanes to cross-link to the film. In certain embodiments, the substrate is thick and/or opaque and is readable from the film side. In other embodiments, the substrate is transparent and/or thin and is readable from the substrate side. One example of a substrate particularly useful in the present invention is a 384-well microtiter plate as shown in FIG. 1A. In a preferred embodiment, the surface of the substrate is modified to contain wells, i.e. depressions in the surface of the substrate. This may be done as is generally known in the art using a variety of techniques, including, but not limited to, photolithography, stamping techniques, molding techniques and microetching techniques. As will be appreciated by those in the art, the technique used will depend on the composition and shape of the substrate.

The film that is coated on the substrate may be any film capable of immobilizing capture particles. For example, the film may be agarose, acrylamide, SEPHADEX, acrylonitrile-butadiene-styrene copolymers, carboxylated styrene-butadiene copolymers, carboxylated ethylene polymers, carboxyl modified poly(acrylamide), poly(caprolactone) diol, carboxylated poly(vinylchloride), acrylic, SEPHADEX, carboxylated vinyl chloride/vinylacetate copolymer carboxylated styrene-butadiene (e.g. Dow Latex 233, Dow Chemical Corp.), or mixtures thereof. In preferred embodiments, the film is a material that will react with the capture particles and present them in the same focal plane. Example 1 below provides certain exemplary films that may be employed. In certain embodiments, the surface of the substrate is glass, and the glass is activated with amino silane, expxy silane, aldehyde silane, poly-L-lysine, etc. The film can be pre-activated with cross-linking groups such as aldehydes, or the groups can be added after the film has been formed. In certain embodiments, the film has heterobifunctional groups, one for attachment to a substrate and one for attachment to capture particles. The film can be formed, for example, by dip coating, spin coating, or any other process which can produce a surface which will immobilize the particles.

III. Immobilizing Capture Particles on Films

The present invention provides capture particles immobilized on films. Any type of method for immobilizing capture particles on films may be employed. In preferred embodiments, both the film and the capture particles have functional groups on their surfaces that are used to immobilize the capture particles on the film. For example, a reaction between aldehydes and amines is one approach to immobilizing capture particles on films. Aldehyde groups, for example, can be added to agarose before or after the film has been formed as shown in the Example 1 below. The aldehyde groups on the film can react with particle-bound amine groups present on either the capture reagent or overcoat. Aldehyde groups on the film can also react with amine groups on the surface of a substrate. For example, the initial reaction between aldehyde and amine groups results in a Schiff base as shown below:

$$f\text{-CHO} + NH_2\text{-}p \rightarrow f\text{-CH}=N\text{-}p$$

where f represents the film and p the particle. This reaction is best carried out at an alkaline pH to convert $NH_3^+$s to $NH_2$s. The Schiff base can be further reduced with sodium borohydride or cyanoborohydride:

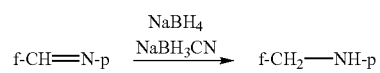

Other functional groups may be employed to attach particles to films. Further examples of such functional groups are those available commercially from PROLINX Inc. (Bothell, Wash.), such as their VERSALINX chemical affinity tools.

Solutions of capture particles can be deposited on a film by any suitable technique such that a capture-spot is formed on the film. For example, solutions of capture particles can be deposited by capillary pens, ink jet printers, syringe pumps, or any other device capable of handling and depositing a solution of capture particles. Spotting of the capture particles may be conducted, for example, in wells of a microplate. Preferably, multiple capture-spots are formed in each well (See, e.g., FIG. 1A). Spotting can be done under controlled or ambient humidity conditions. In preferred embodiments, spotting capture particles on a film is conducted under high humidity conditions (See, e.g, Example 1).

In certain embodiments, after capture particles are immobilized on a film, the film is blocked. Films may be blocked with any material capable of occupying binding sites on the film. Examples of blocking solutions include, but are not limited to, solutions of bovine serum albumin, casein, non-fat dry milk, tRNA, sonicated salmon sperm, or other materials commonly employed in immuno or hybridization assays.

IV. Capture-Spot Size and Density

The present invention provided methods and compositions for applying solutions of capture particles on films such that the capture particles are immobilized on the film in discrete capture-spots on the film. The capture-spots of the present invention are not limited to a certain shape or size. In fact, capture-spots of any size or shape may be employed. For example, FIG. 1A shows a well from a 384 well plate with 25 capture-spots that are roughly circular in shape. Preferably, the size of the capture-spots on the film is optimized such that many targets may be detected in a single array. Also, the density of capture-spots in an array (i.e. how close together the capture spots are) may vary. Preferably, the density of the capture-spots is optimized such that many targets may be detected on a single array. Detailed below are certain exemplary methods that may be employed to optimize capture-spot size and density.

For example, conventional high density arrays would typically have 150 μm diameter spots on a 200 μm pitch. With one target per spot that translates into 2,500 different targets per $cm^2$. If the spotting tool contains 4 pins, this requires 625 reagent changes per $cm^2$ (e.g. going thru wash and dry before picking up next 4 capture probes). Particle-based arrays, however, might have 64 different species in 450 μm diameter spots on a 500 μm pitch. The spot density would be about 400 spots per $cm^2$, but the species density would be 25,600 per $cm^2$. This is an increase of more than 10-fold. With a 4 pin tool, the number of reagent changes would be reduced to about 100 per $cm^2$ which greatly increases fabrication throughput (e.g. by a factor of at least 5-fold since a large fraction of the cycle time is consumed by purging one set of capture reagents from the pins and loading another). Furthermore, employing the capture particles of the present invention, the target is bound over a much smaller area, thus increasing the density of the reporter molecule. For example, suppose on average 16 particles in each capture-spot were coated with the same capture reagent. The total area for each capture species would be 16 times approximately 14 μm per particle or 224 $μm^2$. A conventional 150 μm diameter spot would cover an area of 17,671 $um^2$. For a limiting amount of target in solution, the density of label would be increased almost 80-fold.

The mean number of capture particle replicates is another factor that may be further detailed. Preferably, the number of replicates should be sufficiently large that there is a very small probability of omitting any species of capture particles from a capture-spot. The Poisson distribution shown in FIG. 1B defines that probability. Since, by reading the capture particle codes in every capture-spot it is possible to check each array produced, the number of replicates generally only affects the rate of rejection. Therefore, once an acceptable level of having zero replicates of a particular species of capture particle in a given capture-spot is established, the mean number of replicates can be obtained, for example, from the Poisson distribution shown in FIG. 1B. For example, suppose the capture particles are diluted out so that one expects to find seven replicates of a capture particle species in each capture-spot. Then the probability of having zero replicates of one type (unique species) of capture particle would be just under 0.001. However, if there were 1000 different species of capture particles in an array, the probability of omitting at least one would be almost 40%. To increase the probability of including all species of capture particles to more than 0.999, according to FIG. 1B, there would need to be an average of 14 replicates of each species of capture particle. For example, if there were arrays of 1000 capture particles in all 384 wells of a plate, there would be a probability of only 0.80 that all wells would have totally complete arrays (i.e. having all the unique species of capture particles in all the wells). Although the wells could be inspected after fabrication, this would mean rejecting 20% of the plates if totally complete arrays were desired. To increase the acceptance level to more than 95%, according to FIG. 1B, there would have to be an average of 16 replicates per spot of each species of capture particle. This corresponds to a probability of 0.0000001 of omitting a species of capture particle from an array.

V. Reaction Chambers, Kits, and Systems

In certain embodiments, the present invention provides compositions comprising a microarray inside a reaction chamber. In some embodiments, the reaction chamber forms a sealed environment around the microarray. In preferred embodiments, the sealed (or sealable) environment allows a test sample to enter the reaction chamber and contact the microarray without the risk of contamination. The reaction chamber may be any material capable of surrounding the microarray. For example, a reaction chamber may be silicone gaskets, molded plastic, deep-etched silicon, or any other engineered material commonly employed for reaction cartridges. In certain embodiments, the microarrays of the present invention are formed on the interior of enclosed devices as described, for example, in U.S. Pat. Nos. 6,126,899 and 6,124,138 to Woudenberg et al., both of which are hereby incorporated by reference.

The present invention also provides kits and systems for making and using the microarrays of the present invention. In some embodiments, the kits and systems comprise various components for generating the capture particles of the present invention (e.g. polystyrene particles, solutions for adding reactive groups the surface of the particles, one or more capture reagents, reagents for coating a substrate with a film, buffers and other components used to make a particle solution, etc.). In this regard, any assortment of components may be assembled into a system or kit, such that, for example, a user may coat a given substrate with film-immobilized particles in order to generate microarrays. These systems and kits may also include instructions for employing the components of the system or kit to generate the microarrays of the present invention. Other components may be, for example, the various reagents listed in section I above.

The kits and systems of the present invention may also comprise substrates already coated with film-immobilized capture particles (e.g. capture particles immobilized on the film in the form of capture-spots) along with various other reaction components that may be employed to perform detection reactions with the microarrays of the present invention. For example, kits of the present invention may comprises a substrate with film-immobilized capture particles, as well as, a secondary antibody, an enzyme employed to illuminate a bound target, an enzyme employed to cleave a bound nucleic acid target, a polymerase to extend primers immobilized to particles, or buffers, a reaction chamber to seal the microarray from the outside environment, control target samples (e.g. known to contain the target), etc. Instructions for employing the microarrays of the present invention may also be included.

VI. Detection Assays

The film-immobilized capture particles of the present invention are preferably employed for detecting the presence or absence of target molecules (e.g. target molecules in a test sample). Any method for detecting target molecules that, for example, employs a solid support, or may be adapted to employ a solid support, may be performed with the film-immobilized capture particles of the present invention (e.g. simple binding assays, or more complex assays with multiple components). In some embodiments, one component of a detection assay (e.g. antibody or oligonucleotide) is attached to a particle and serves as the capture reagent. Other components of a detection assay (e.g., secondary antibody, nucleic acid cleavage enzymes, etc.) may then be added before, after, or simultaneously with a sample suspected of containing target molecules (i.e. a test sample). In certain embodiments, the test sample is contacted with the film-immobilized capture particles of the present invention and various operations are carried out, such as the addition of miscellaneous reagents, incubations, washings, and the like. In this regard, substrates coated with film-immobilized capture particles may carry out thousands of detection reactions (e.g., immunoassay, DNA detection assays, etc.) on the film to determine if target molecules are present in a test sample.

In some embodiments, the film-immobilized capture particles are employed with immunoassay procedures. Any type of immunoassay may be employed with the film-immobilized capture particles of the present invention (see, e.g., U.S. Pat. Nos. 4,016,043; 4,424,279 and 4,018,653, all of which are herein incorporated by reference). For example, a one-step sandwich immunoassay may be performed by first incubating a mixture of secondary labeled antibody with a test sample and flowing this mixture over film-immobilized capture particles. Finally, the film and immobilized particles are washed, and bound targets are detected. This procedure may also be employed in a competitive binding assay format where the secondary labeled antibody would compete for the capture reagent instead of binding to the target. Another example is a two-step sandwich immunoassay that may be employed by flowing a test sample over the film-immobilized capture particles. Next, the film and immobilized capture particles are washed. Then a secondary labeled antibody reagent is applied to the surface of the film, and the film and immobilized capture particles are washed. This procedure may also be employed, for example, for a delayed-addition competitive binding assay where the labeled antibody reagent would bind to unoccupied sites on the capture particles.

In some embodiments, the film-immobilized capture particles are employed with nucleic acids (e.g. to detect specific target DNA or RNA sequences or single nucleotide polymorphisms in DNA or RNA sequences). However, any biological binding molecule may be used with the present invention (e.g., aptimers, peptoids, peptides, PNAs, artificial oligonucleotide structures, small molecules [e.g., drugs]). Any type of nucleic acid sequence may be employed. For example, the nucleic acids may be single stranded or double stranded, or contain portions of both double stranded or single stranded sequence. Also, the nucleic acid may be DNA, both genomic and cDNA, RNA or a hybrid, where the nucleic acid contains any combination of deoxyribo-and ribo-nucleotides, and any combination of bases, including uracil, adenine, thymine, cytosine, guanine, inosine, xanthanine, hypoxanthanine, isocytosine, isoguanine, and base analogs such as nitropyrrole and nitroindole, 7-deaza purines (e.g., 7-deaza-adenine and 7-deaza-guanine); bases modified, for example, to provide altered interactions such as non-standard basepairing, including, but not limited to: IsoC, Iso G, and other modified bases and nucleotides described in U.S. Pat. Nos. 5,432,272; 6,001,983; 6,037, 120; 6,140,496; 5,912,340; 6,127,121 and 6,143,877, each of which is incorporated herein by reference in their entireties. In some embodiments, the nucleic acids attached to the particles are libraries of clonal nucleic acids, including DNA and RNA. In certain embodiments, a hybridization assay is performed with oligonucleotides immobilized to the particles as the capture reagent. For example, a hybridization assay could be preceded by a replication or amplification step which incorporated a label into the product that could be performed by first mixing a test sample with polymerase and labeled primers or bases in order to generate labeled oligonucleotides. This reaction product may then be flowed over the film-immobilized capture particles and incubated. Finally, the film and immobilized particles may be washed, and bound target detected. The label could alternatively be incorporated after the target had been captured by flowing the test sample over the film-immobilized capture particles and incubating and replacing the sample with polymerase and labeled bases.

In preferred embodiments, genomic profiles are generated using the film-immobilized capture particles of the present invention in a "DNA chip" or "RNA Chip" format. For example, in these types of assay, a series of oligonucleotide probes are affixed to particles, thereby generating capture particles. The oligonucleotide probes are designed to be unique to a given gene, SNP, sequence, or mutation. The DNA sample of interest is then contacted with the DNA "chip" (e.g. the film-immobilized particles with attached oligonucleotides) and hybridization is detected. In some embodiments, the DNA chips of the present invention are constructed in similar fashion to other DNA detection devices known in the art (e.g. GeneChip, Affymetrix, Santa Clara, Calif.; See e.g., U.S. Pat. Nos. 6,045,996; 5,925,525; and 5,858,659; each of which is herein incorporated by reference), except the present invention employs film-immobilized capture particles with attached oligonucleotides in order to capture targets.

In certain embodiments, the nucleic acid to be analyzed in the target sample are isolated, amplified by PCR, and labeled with a fluorescent reporter group. The labeled DNA is then incubated with the microarray using a fluidics station. The microarray is then inserted into a scanner, where patterns of hybridization are detected. The hybridization data are collected as light emitted from the fluorescent reporter groups already incorporated into the target, which is bound to the microarray. Nucleic acid probes on the particles that match the target generally produce stronger signals than those that have mismatches. Since the sequence and position of each nucleic acid probe on the microarray are known (see, e.g., encoding discussion above), by complementarity, the identity of the target nucleic acid applied to the probe array can be determined.

In some embodiments of the present invention, immobilized capture particles are used with known assays that detect hybridization by enzymatic cleavage of specific structures (e.g., INVADER assay, Third Wave Technologies; See e.g., U.S. Pat. Nos. 5,846,717; 6,090,543; 6,001,567; 5,985, 557; and 5,994,069; Lyamichev et al., Nat. Biotech., 17:292 (1999), Hall et al., PNAS, USA, 97:8272 (2000), Agarwal et al., Diagn. Mol. Pathol. 9:158 [2000], Cooksey et al., Antimicrob. Agents Chemother. 44:1296 [2000], Griffin and Smith, Trends Biotechnol., 18:77 [2000], Griffin and Smith, Analytical Chemistry 72:3298 [2000], Hessner et al., Clin. Chem. 46:1051 [2000], Ledford et al., J. Molec. Diagnostics 2,:97 [2000], Lyamichev et al., Biochemistry 39:9523 [2000], Mein et al., Genome Res., 10:330 [2000], Neri et al., Advances in Nucleic Acid and Protein Analysis 3826:117 [2000], Fors et al., Pharmacogenomics 1:219 [2000], Griffin et al., Proc. Natl. Acad. Sci. USA 96:6301 [1999], Kwiatkowski et al., Mol. Diagn. 4:353 [1999], and Ryan et al., Mol. Diagn. 4:135 [1999], Ma et al., J. Biol. Chem., 275: 24693 [2000], Reynaldo et al., J. Mol. Biol., 297:511 [2000], and Kaiser et al., J. Biol. Chem., 274:21387 [1999]; and PCT publications WO97/27214 and WO98/42873, each of which is herein incorporated by reference in their entirety for all purposes), wherein at least one of the components of the INVADER assay is attached to particles as a solid support. The INVADER assay detects specific DNA and RNA sequences by using structure-specific enzymes (e.g. FEN-1 enzymes) to cleave a complex formed by the hybridization of overlapping oligonucleotide probes. Elevated temperature and an excess of one of the probes enable multiple probes to be cleaved for each target sequence present without temperature cycling. These cleaved probes then, in some embodiments, direct cleavage of a second labeled probe. The secondary probe oligonucleotide can be 5'-end labeled with fluorescein that is quenched by an internal dye. Upon cleavage, the de-quenched fluorescein labeled product may be detected using a standard fluorescence plate reader.

In particular embodiments, the capture particles with attached nucleic acids are employed in triplex-mediated capture methods. One example includes U.S. Pat. No. 5,591,841, hereby incorporated by reference.

In some embodiments, hybridization of a bound probe is detected using a TaqMan assay (PE Biosystems, Foster City, Calif.; See e.g., U.S. Pat. Nos. 5,210,015 and 5,538,848, each of which is herein incorporated by reference), wherein at least one of the components of the TaqMan assay are attached to the particles of the present invention. The assay is performed during a PCR reaction. The TaqMan assay exploits the 5'-3' exonuclease activity of the AMPLITAQ GOLD DNA polymerase. A probe, specific for a given allele or mutation, is included in the PCR reaction. The probe consists of an oligonucleotide with a 5'-reporter dye (e.g., a fluorescent dye) and a 3'-quencher dye. During PCR, if the probe is bound to its target, the 5'-3' nucleolytic activity of the AMPLITAQ GOLD polymerase cleaves the probe between the reporter and the quencher dye. The separation of the reporter dye from the quencher dye results in an increase of fluorescence. The signal accumulates with each cycle of PCR and can be monitored with a fluorometer.

Figure 13:
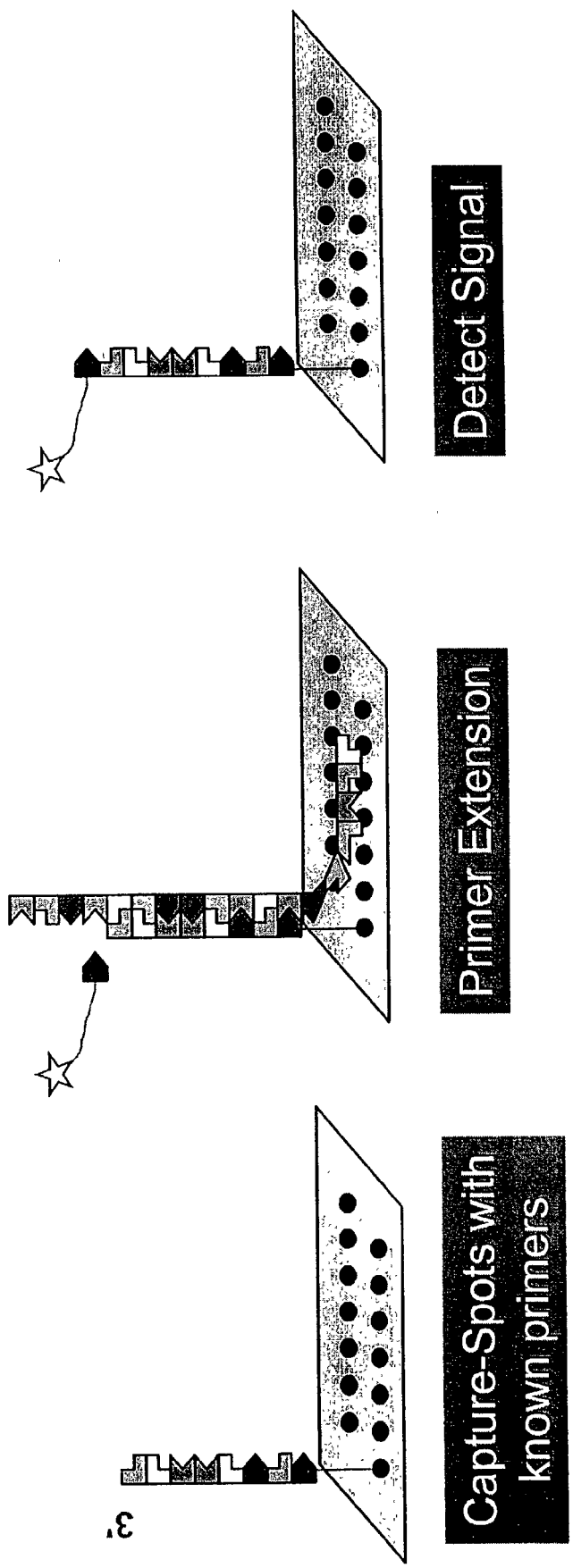
FIG. 13 shows capture spots configured for an APEX assay.

In other embodiments, the film-immobilized capture particles of the present invention are employed in an Arrayed Primer Extension (APEX) assay (See, e.g., U.S. Pat. No. 6,153,379 to Caskey et al., Kurg et al., *Clin. Chem. Lab Med.*, 38(2):165–170, 2000, and WO0063677, all of which are hereby incorporated by reference). APEX is based upon a two-dimensional array of oligonucleotides immobilized via 5' end on a surface (e.g., 'DNA chip'). In an APEX assay, for example, a patient DNA sample is amplified via PCR and annealed to the primers, which promote sites for template-dependent DNA polymerase extension reactions. DNA polymerase uses four unique fluorescently labeled dideoxynucleotides. As a result of this reaction each primer identifies one base in the target sequence (See, FIG. 13). Covalent bonds between oligo and dye terminator allow the slides to be stringently washed, minimizing thereby the background scatter noise. The time required for the complete APEX analysis is less than four hours including sample preparation. FIG. 13 shows an exemplary configuration of the capture particles of the present invention useful for performing APEX reactions.

In still further embodiments, the film-immobilized capture particles of the present invention may be employed in the SNP-IT primer extension assay (Orchid Biosciences, Princeton, N.J.; See e.g., U.S. Pat. Nos. 5,952,174 and 5,919,626, each of which is herein incorporated by reference), wherein at least one of the components of this assay is attached to the particles of the present invention. In this assay, SNPs are identified by using a specially synthesized DNA primer and a DNA polymerase to selectively extend the DNA chain by one base at the suspected SNP location. DNA in the region of interest is amplified and denatured. Polymerase reactions are then performed using miniaturized systems called microfluidics. Detection is accomplished by adding a label to the nucleotide suspected of being at the SNP or mutation location. Incorporation of the label into the DNA can be detected by any suitable method (e.g., if the nucleotide contains a biotin label, detection is via a fluorescently labelled antibody specific for biotin).

In further embodiments, particular devices are employed that facilitate the detection of nucleic acid polymorphisms. Exemplary devices are provided in U.S. Pat. No. 5,935,785, assigned to Motorola Inc., hereby incorporated by reference.

The present invention may be employed to detect any type of target molecule in a test sample (see binding pairs described in section I above). Further examples of targets that may be detected by the film-immobilized capture particles of the present invention are viruses, prokaryotic and eukaryotic cells, unicellular and polycellular organism cells, e.g., fungi, animal, mammal, etc., or fragments thereof. The microarrays of the present invention may also be used for detecting pathogens. For example, monoclonal antibodies may be linked to the surface to serve as catching antibodies (i.e. capture reagents). The sample would then be added and cells having the epitope recognized by the antibody would bind to the antibody on the surface. Nonspecifically bound pathogens are washed away leaving substantially only specifically bound ones. Labeled monoclonal antibodies are then added which are specific for an epitope other than the epitope recognized by the catching antibody. Pathogens of interest may be viruses such as Herpesviruses, Poxyiruses, Togaviruses, Flaviviruses, Picornaviruses, Orthomyxoviruses, Paramyxoviruses, Rhabdoviruses, Coronaviruses, Arenaviruses, and Retroviruses. Targets may also include bacteria including, but not limited to, *Escherichia coli, Pseudomonas aeruginosa, Enterobacter cloacae, Staphylococcus aureus, Enterococcus faecalis, Klebsiella pneumoniae, Salmonella typhimurium, Staphylococcus epidermidis, Serratia marcescens, Mycobacterium bovis,* methicillin resistant *Staphylococcus aureus* and *Proteus vulgaris.* The examples of such pathogens are not limited to above pathogens. A non-exhaustive list of these organisms and associated diseases can be found for example in U.S. Pat. No. 5,795,158 issued to Warinner and incorporated herein by reference.

Assays using the film-immobilized capture particles of the present invention can be carried out with a test sample (e.g. biological fluid), including, but not limited to, separated or unfiltered biological fluids such as urine, cerebrospinal fluid, pleural fluid, synovial fluid, peritoneal fluid, amniotic fluid, gastric fluid, blood, serum, plasma, lymph fluid, interstitial fluid, tissue homogenate, cell extracts, saliva, sputum, stool, physiological secretions, tears, mucus, sweat, milk, semen, seminal fluid, vaginal secretions, fluid from ulcers and other surface eruptions, blisters, and abscesses, and extracts of tissues including biopsies of normal, malignant, and suspect tissues or any other constituents of the body which may contain the target of interest. Other similar specimens such as cell or tissue culture or culture broth may also be employed. Alternatively, the test sample may be obtained from an environmental source such as soil, water, or air; or from an industrial source such as taken from a waste stream, a water source, a supply line, or a production lot. Industrial sources also include fermentation media, such as from a biological reactor or food fermentation process such as brewing; or foodstuff, such as meat, game, produce, or dairy products. The test sample can be pre-treated prior to use, such as preparing plasma from blood, diluting viscous fluids, or the like; methods of treatment can involve filtration, distillation, concentration, inactivation of interfering compounds, and the addition of reagents.

The microarrays of the present invention may also be used to assay test compounds, for example, to evaluate their potential as a therapeutic. For example, the ability of test compounds to serve as agonists or antagonists in certain binding reactions (e.g. where the binding partners are known, and one of them is immobilized to a film-immobilized particle) may be evaluated.

VII. Detecting Targets

In certain embodiments of the present invention, after an assay has been performed, the film-immobilized particles are read to determine the identity of the capture particles generating a signal (or to ascertain geometric properties of particles such as shape or size), and in some embodiments, the amount of label bound. Any method may be employed to detect a signal that is generated. Examples of means that may be used for detection and analysis include, but are not limited to, visual inspection, digital (CCD) cameras, video cameras, photographic film, or the use of current instrumentation such as laser scanning devices, fluorometers, luminometers, photodiodes, quantum counters, plate readers, epifluorescence microscopes, scanning microscopes, confocal microscopes, capillary electrophoresis detectors, or by other means for amplifying the signal such as a photomultiplier tube or other light detector capable of detecting the presence, location, intensity, excitation and emission spectra, fluorescence polarization, fluorescence lifetime, and other physical properties of the fluorescent signal. The identity of the capture particles may then be determined, for example, from either its XY location on the film or from its integral code.

For example, if capture particles incorporating a fluorescent dye are employed, this encoding can be used to aid in focusing and provide a reference signal. The reference dye can be incorporated into the particles, or dyed reference particles can be mixed in with the particles. Absent a reference fluor, focusing may be done using transmitted or scattered light.

With fluorescent labels, measurement can be made, for example, with a confocal laser scanner or a CCD imager. In certain embodiments, a confocal laser scanner is preferred since it minimizes interference between particles. Preferably, measurements are made at sufficient resolution to resolve individual particles. Generally, particles with diameters in the range of 1–5 µm are read under 10–20× magnification or the beam size is less than the particle diameter.

In general, imperfections in measurements can be corrected with image processing algorithms (See, e.g, Example 1). These may be performed, for example, on either the gray-scale or binary image. Accuracy can be further improved, for example, by ratioing target signals to reference dyes in either the particles or separate internal standards particles. In other embodiments, reference particles can be mixed in amongst assay particles. Results can be reported in concentration units by use of a calibration curve. This curve may be derived from reading known standards. In some embodiments, very small particles (e.g. less than 1 µm) can be co-immobilized to aid in image processsing. These particles can be used in algorithms to calculate the point spread function of the substrate and optical system. In certain embodiments, a transmitted light image is employed as a mask when fluorescent detection is employed (See, e.g., Example 1).

EXPERIMENTAL

The following examples are provided in order to demonstrate and further illustrate certain preferred embodiments and aspects of the present invention and are not to be construed as limiting the scope thereof.

In the experimental disclosure which follows, the following abbreviations apply: N (normal); M (molar); mM (millimolar); µM (micromolar); mol (moles); mmol (millimoles); µmol (micromoles); nmol (nanomoles); pmol (picomoles); g (grams); mg (milligrams); µg (micrograms); ng (nanograms); l or L (liters); ml (milliliters); µl (microliters); cm (centimeters); mm (millimeters); µm (micrometers); nm (nanometers); DS (dextran sulfate); C (degrees Centigrade); and Sigma (Sigma Chemical Co., St. Louis, Mo.).

Example 1

Film-immobilized Particles

This example describes methods for generating substrates coated with film-immobilized capture particles, and methods for detecting targets. In particular, this example describes general methods and procedures that were employed in Examples 2–5.

A. Film Coated Substrates

Detailed below are various methods for generating substrates coated with a film.

i. Aldehyde-Derivatized Agarose Films on Glass Substrates

Aldheyde derivatized agarose films were generated by sodium periodate oxidation (See, Parikh et al. (1974), *Methods in Enzymology*, 34: 77–102). Films of 1% agarose were formed by dip-coating cleaned glass microscope slides. The slides were derivatized in a 0.1 M $NaIO_4$ solution (Aldrich) for 1 hour in a high density polyethylene (HDPE) coplin staining jar on a rotary shaker running at 120 rpm. Derivatized slides were washed in de-ionized (DI) water, then excess water was blown off with a stream of dry $N_2$. The slides were dried overnight at room temperature and humidity on blotting paper under cover.

The agarose films were fabricated from a 1% solution of agarose (Promega Corporation) which was prepared on a heated stir plate by adding 0.4 g of powder to 40 mL of DI water in a 100 mL beaker containing a Teflon-coated stir bar that vigorously agitated the solution. The beaker was covered with plastic wrap and a small hole punched through the center to vent vapor. The solution was brought to a boil which was maintained at a gentle level for 5 minutes until the agarose was completely dissolved and the solution was clear. DI water was then added to replace that lost to vaporization as the solution continued to be stirred on the hot plate.

Prior to melting the agarose, a 50 mL HDPE container was inserted in a weighted holder and placed in a water bath which was brought up to 60° C. The hot agarose solution was poured into the pre-heated container and allowed to equilibrate for 5 minutes.

A batch of slides was then dip coated in the 60° C. agarose. Each slide was slowly lowered into the solution with plastic forceps until all but the frosted end was immersed. The slide was then withdrawn in a steady motion lasting approximately 10 seconds. Slides were immediately placed on blotting paper and covered with a plastic box to protect the film from airborne particulates. The slides were allowed to gel for a minimum of 30 minutes and then transferred to a microscope slide box for storage.

Prior to dip coating, microscope slides were cleaned in a 2% Hellmanex (Fisher Scientific) DI water solution to remove contaminants from the glass. Eight slides were loaded into each of two glass staining trays which were suspended in IL of Hellmanex in an ultrasonic bath. Following 30 minutes of cleaning, the sides were transferred in the baskets to the companion staining dishes filled with approximately 200 mL of 18 megohm DI water. Slides were agitated to remove residual detergent, then the solution was poured off and the dish refilled with 18 megaohm DI water. This was repeated a total of three times.

After the final rinse, slides were soaked for 30 minutes to leach out any small molecules which may be in the pores of the glass. Then the slides were removed one at a time from the glass staining dish with plastic forceps and dried with a stream of nitrogen gas. The slides were stored in covered slide dishes at ambient humidity (which was in the range of 30 to 35%).

ii. Glyoxal Agarose Films on Glass Substrates

A 1% solution of glyoxal agarose (BioWhittaker Molecular Applications, NuFix Glyoxyl Agarose) and cleaned glass microscope slides were prepared according to the procedures described above. A batch of 25 to 50 clean glass slides were then dip coated in the 60° C. glyoxal agarose and gelled at room temperature and humidity. The slides were stored at ambient conditions in microscope slide boxes.

iii. Glyoxal Agarose Films on Amino-Silanated Substrates

To covalently link the film to the glass substrate, glyoxal agarose was dip coated onto amino-silanated slides (CEL Associates, CSA-100, Silanated Slides). The procedure was the same as the one described above, except the only pre-cleaning was to remove particulates with a stream of dry nitrogen gas. The slides were stored in their original box at ambient temperature and humidity.

B. Particle Suspensions

A 0.2% w/v spotting suspension of streptavidin-coated particles, 3.18 µm in diameter was made from the 0.5% w/v suspension supplied by the manufacturer (Spherotech, Inc., SVP-30-5) by adding 8 µL of concentrated particles to 100 µL of CTEG (0.1M carbonate buffer, pH 9.5, 0.05% v/v Tween20, 20% v/v ethylene glycol) spotting solution. After vortexing, the particles were pelleted by centrifuging for 1 minute. 84 µL of supernatant was aspirated off with a pipettor leaving 20 µL in the microtube. The particles were resuspended by vortexing before printing.

A 0.1% w/v spotting suspension of 6.2 µm diameter streptavidin-coated particles was made from the 0.5% w/v suspension supplied by the manufacturer (Spherotech, Inc., SVP-60-5) by adding 4 µL of concentrated particles to 100 µL of CTEG spotting solution. After vortexing, the particles were pelleted by centrifuging for 1 minute. 88 µL of supernatant was aspirated off with a pipettor leaving 20 µL in the microtube. The particles were resuspended by vortexing before printing.

A 0.2% w/v spotting suspension of biotin-coated particles, 3.36 µm in diameter was made from the 0.5% w/v suspension supplied by the manufacturer (Spherotech, Inc., TP-30-5) by adding 8 µL of concentrated particles to 100 µL of CTEG spotting solution. After vortexing, the particles were pelleted by centrifuging for 1 minute. 88 µL of supernatant was aspirated off with a pipettor leaving 20 µL in the microtube.

A 0.2% w/v spotting suspension of 3.2 um diameter goat anti-mouse IgG(Fc) coated particles 3.2 µm was made from the 0.5% w/v suspension supplied by the manufacturer (Spherotech, Inc. MPFc-30-5) by adding 8 µL of concentrated particles to 100 µL of PBST (PBS, pH 7.4, with 0.05% Tween20) spotting solution. After vortexing, the particles were pelleted by centrifuging for 1 minute. 88 µL of supernatant was aspirated off with a pipettor leaving 20 µL in the microtube. The particles were resuspended by vortexing before printing.

Biotinylated oligos (Immunicon, Inc. 5' biotin-GGT-CAAGTTTTCGCAGTAGA-fluorescein, SEQ ID NO:1) were coated onto 3.18 µm diameter streptavidin-polystyrene particles. A 0.12% w/v spotting suspension was made from the 0.5% w/v coating suspension by adding approximately 8 µL of coated particles to 100 µL of CTEG spotting solution. After vortexing, the particles were pelleted by centrifuging for 1 minute. 88 µL of supernatant was aspirated off with a pipettor leaving 20 µL in the microtube. The particles were resuspended by vortexing before printing.

C. Spotting Particles on Films

Particles were manually spotted on films using a slotted pin assembly (V&P Scientific, Inc., VP478, Floating Pin Replicator) mounted in a custom holder. The assemblies consisted of a 0.018" diameter slotted steel pin that extended 0.75" out of a 1.25" long tube which had a 0.062" outer diameter (OD). Holders were fabricated from 4" long sections of 13 gauge stainless steel tubing (Small Parts, Inc., HTX-13–12, Hypo Tube, Type 304 Stainless steel, 13 ga., 0.071" inner diameter (ID)×0.095" OD). The pin assemblies were held in between two ¼" long pieces of Tygon tubing (Cole-Parmer Instrument Co.) at either end of the larger diameter segment. A set of eight pins was typically used for a spotting. The pins were coated with a 1:5 dilution of surfactant (V&P Scientific, Inc., VP 110 Surfactant) according to the manufacturer's instructions, and cleaned daily according to the manufacturer's recommendations.

The spotting pin was guided by placing it in a slot cut in a 1" square×3" block of Teflon. For the high-humdity spotting procedure described below, the block was placed on the top cover of the humidification chamber with the slotted end extending over the opening above the slide. For the ambient-humidity spotting procedure, the guide block was supported approximately 3" above the surface of film on a platform placed behind the slide.

Prior to spotting, slides were marked with an ID number corresponding to their slot in the storage box, and a targeting template was mounted to the back with cyanoacrylic adhesive (Bob Smith Industries, Tom Thumb Insta-Cure+, Gap Filling Cyanoacrylate). The template was generated in Visio and printed with a LaserJet on transparency stock. The major reference lines used for locating well chambers were marked on the top of the slide with a diamond tipped scribe. If there was not a frosted end, then a scribe mark was made in the upper right hand corner on the slide. Before the slides were immersed in the blocking solution, the targeting template was peeled off and excess adhesive removed from the back with an X-Acto knife and synthetic wiper.

i. Ambient-humidity Spotting

Slides were spotted with particles in ambient humidity, which ranged from 30 to 40%. Microscope slides with targeting template adhered to the back were placed on a 1" high stand in front of a platform on which was placed the pin guide block 1.75" above the film on the top surface of the coated slide.

The pin was first primed by dipping the tip into the particle solution (particle suspension) and then touching it to a sheet of blotting paper. It was then immersed ⅛" to ¼" into the particle solution, depending on the volume in the 0.65 mL microtube. This was repeated 2 to 3 times before the first spot from a particle suspension was deposited on the film. Microtubes were vortexed before spotting.

Particles were typically spotted on films in rows parallel to the long axis of the microscope slide starting in the upper right hand corner. The overall pattern was right to left, and top to bottom. When one row was completed, then the next row would be started below it at the right end. Occasionally, particles would be deposited in columns by moving top to bottom then right to left.

Each spot was made by immersing the tip of the pin 1/8" to 1/4" into the particle suspension, then touching it to the surface of the film. The pin was slowly withdrawn from the particle suspension and lowered vertically onto the surface by placing the pin holder in the guide block. The tip was contacted with the surface for 1–2 seconds before it was lifted off still guided by the slotted Teflon block. A headband magnifier was worn to assure precise placement of the spots and uniform immersion of the tips.

Spotting solutions ranging in pH from 7.4 to 10.5 showed good results with different particle types. The goat anti-mouse antibody coated particles (see Example 2 below) worked well suspended in a phosphate buffered saline (PBS) solution, pH 7.4, with 0.05% v/v Tween 20, PBS/Tw. The solution evaporated less than 10 seconds after the pin was lifted from the film.

Figure 2:
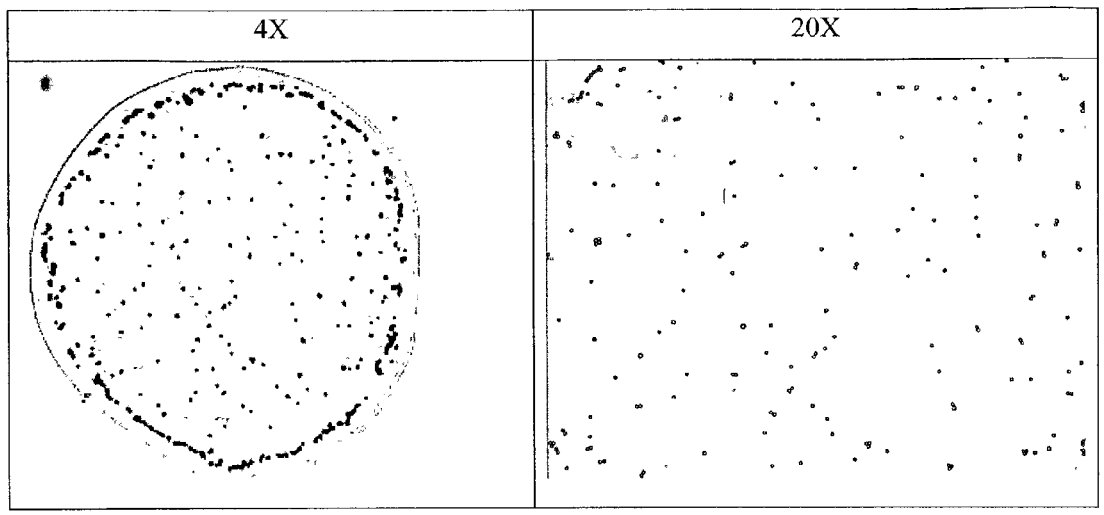
FIG. 2A shows a 4× and 20× objective view of a capture-spot that has been formed on a film under ambient humidity conditions.
FIG. 2B shows the frequency of various sizes of the objects shown in FIG. 2A.
Figure 2:
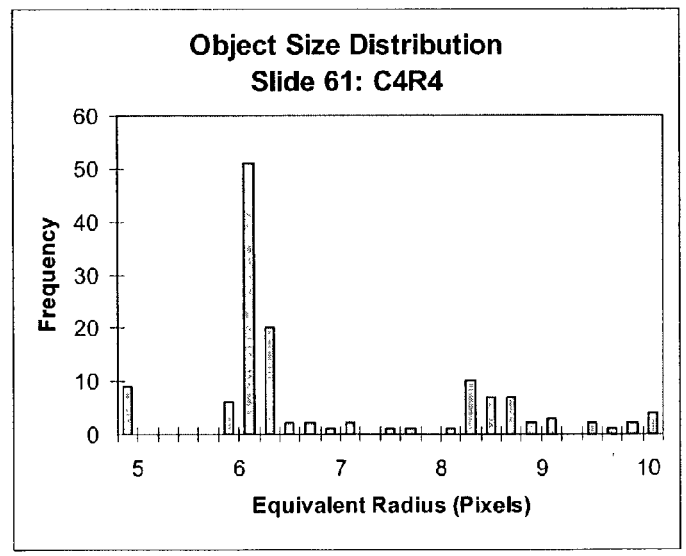

Particles spotted in PBS/Tw under ambient humidity conditions were typically distributed across discs 0.52 to 0.56 mm diameter. Images of spot r4c4 on slide 61, which had a particle concentration of 0.2% w/v, are shown in FIG. 2A at 4× and 20× magnification. The average diameter of the spot is 0.54 mm, and it contains approximately 500 particles. Only about $1/3^{rd}$ are individual particles, while $1/5^{th}$ are "twins". Half o particles are in aggregates of more than two particles, many of which form a ring around the perimeter of the spot (a single particle was defined as any object containing 5 to 13 pixels, twins particles were objects with 14 to 23 pixels, and so forth). The total number of particles was obtained by summing the number in each category. These rings of aggregated particles were presumably caused by evaporation-driven flow of solution towards the edge (See, e.g., Deegan R D et al., 1997, Nature, 389:827).

The 20× field of view was generally in the center of the spot where the majority of particles were monodispersed (See, FIG. 2A). The distribution of objects is shown in the FIG. 2B. Between 81 and 85 individual particles were selected from fluorescence intensity measurements There are a total of 134 objects in this field of view with approximately 60% representing individual particles (See, FIG. 2A). Details on the image processing algorithms which generated these measurements are given in detail below. As shown in FIG. 2B, there are 81 single particles, which were arbitrarily defined as objects with an equivalent radius, EqRad, between 5.9 and 6.9 pixels. The 9 small objects, with an EqRad less than 5 pixels, are particulate contaminants. There are 5 objects with an EqRad between 6.9 and 7.9 which are most likely single particles with slightly larger diameters or which dilated more in the image processing. The 30 objects with EqRad between 8.2 and 9.2 are "twin" particles, which have adhered together. There are 9 objects with EqRad greater than 9.2 pixels, these are aggregates of more than 2 particles.

ii. High-humidity Spotting

In order to minimize evaporation-driven transport of particles to the edge of the deposited drop, spotting was done in a humidification chamber using solutions containing ethylene glycol. A clear acrylic box, 4.5"W×9.25"L×2.5"H with a hinged top was used for a humidification chamber. An access door 3.0"W×1.0"D was cut into one end of the top and hinged with vinyl electrical tape.

Humidity was maintained in the chamber by saturating a 3" square piece of 0.25" open cell foam with a 50% propylene glycol DI water solution. The foam was placed in a 3.5" square petri dish directly under the access door at the end of the box. Two 4.25" long rectangular plastic rods, 0.25"×0.062", were placed across the petri dish to hold microscope slides above the foam. A humidity meter was placed next to the petri dish to measure relative humidity inside the chamber. The humidity generally stabilized around between 75 and 80% after the chamber had been closed for 5 to 10 minutes.

Particle suspensions were spotted onto dip-coated films using the methods described above. A slide would be placed on the rails over the foam under the access door. Then the lid would be closed and the atmosphere allowed to come to at least 70% relative humidity before spotting would proceed. Printing did not proceed for at least 5–10 minutes to allow the gel to dehydrate from the humidified air.

Spotting solutions of 20% ethylene glycol, 0.05% Tween 20 in 0.1 M carbonate buffer at pH 9.5 and 10.5 showed good results with different particle types. The biotin, streptavidin, and oligo-coated particles (detailed in the Examples below) were immobilized from a 0.2% w/v suspension of particles in a 0.1 M carbonate buffer solution, pH 9.5, containing 20% v/v ethylene glycol and 0.05% v/v Tween 20. Particles were reacted with the film for approximately 2 to 8 hours.

Figure 3:
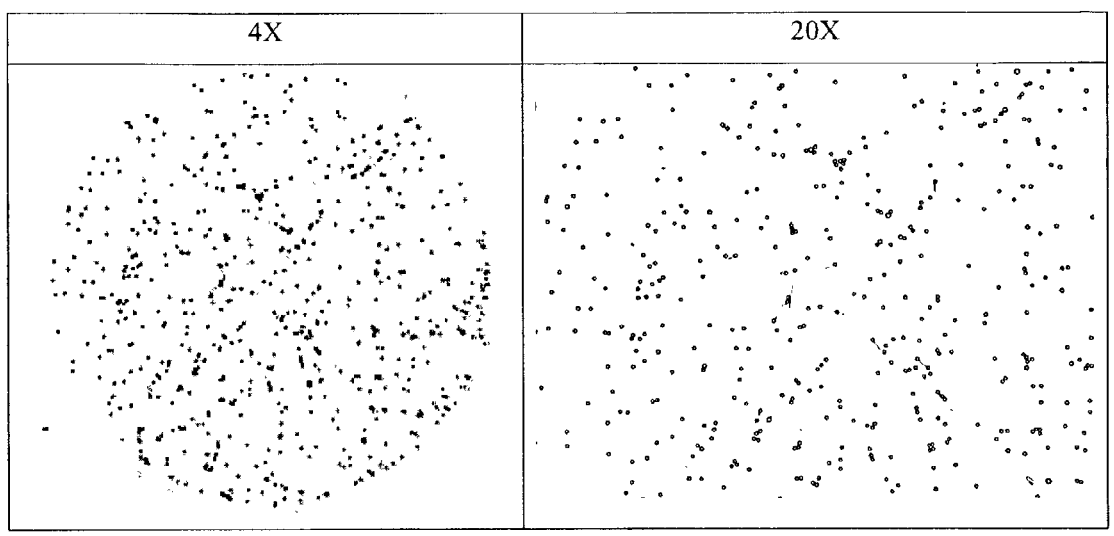
FIG. 3A shows a 4× and 20× objective view of a capture-spot of capture particles that has been applied to a film under high humidity conditions.
FIG. 3B shows the frequency of various sizes of the objects shown in FIG. 3A.
Figure 3:
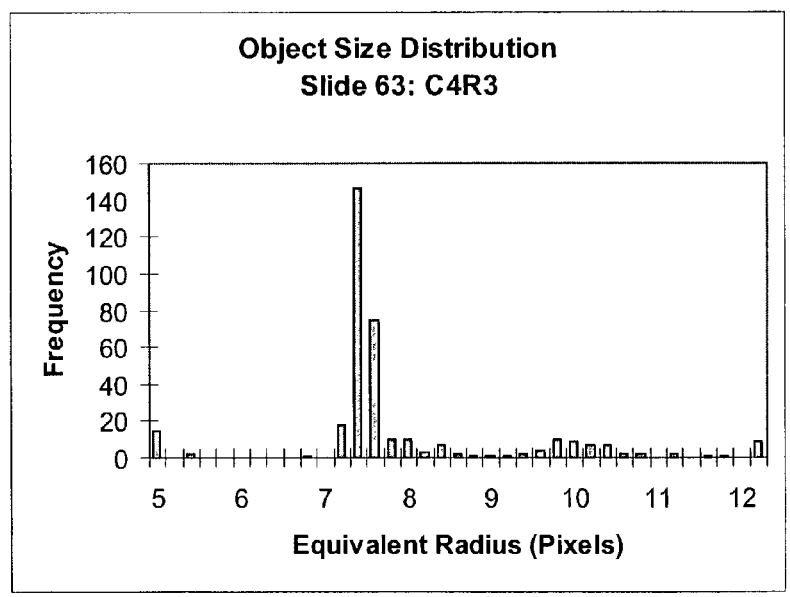

Particles spotted in this solution under high humidity conditions were typically distributed across discs 0.52 to 0.56 mm in diameter. Images of spot c4r3 on slide 63, which had a particle concentration of 0.2% w/v, are show in FIG. 3A at 4× and 20× magnification. The average diameter of the spot is 0.54 mm, and it contains approximately 300 individual particles. There are approximately 400 objects in the spot, 75% of them contained 4 to 9 pixels which corresponded to an equivalent radius between 1.13 and 1.69 pixels.

Only a fraction of the total particles in each 20× image was selected for fluorescence measurements. The distribution of objects is shown in the FIG. 3B. There are a total of 347 objects in this field of view (FIG. 3A) with approximately 73% representing individual particles. Details on the image processing algorithms which generated these measurements are given below. There are 253 single particles, which were arbitrarily defined as objects with an equivalent radius, EqRad, between 6.9 and 7.9 pixels (1 pixel equals approximately 0.335 μm on the slide). The 17 small objects with an EqRad less than 5.4 pixels, are particulate contaminates. There are 5 objects with an EqRad between 7.9 and 8.8 which are most likely single particles with slightly larger diameters or which dilated more in the image processing. The 46 objects with EqRad between 8.8 and 10.8 are "twin" particles, which have adhered together. Several of these can be seen in the upper right hand corner of the 20× image of FIG. 3A. There are 13 objects with EqRad greater than 10.8 pixels, these are aggregates of more than 2 particles. The ring of aggregated particles around the perimeter is generally absent under these spotting conditions. For the 3 μm streptavidin particles, 190 to 321 individual particles were selected from the 20× images for fluorescence intensity measurements.

D. Blocking Films

Few of the aldehyde groups in the film are linked to particles after the spotting step. A protein solution such as bovine serum albumin (BSA) or casein can be used to block reactive groups in the films from reacting with targets or label reagents. Therefore, after the particles were immobilized, the slides were transferred to a coplin staining jar (ScienceWare) containing 40 mL of a 1% BSA/PBS (Sigma) solution. Slides were taped to the platform of a rotary shaker and agitated at 120 rpm for 1 hour.

The excess BSA was removed by transferring the slides to another coplin staining jar containing 40 mL of PBS. The sides were gently agitated for 1–2 min, then the solution was poured off and jar refilled with PBS. This was repeated 2 more times, after which the slides were rinsed in DI water and excess solution blown off with a stream of dry $N_2$.

The effectiveness of BSA blocking can be seen from the film background rates in Examples 2–5 below. The increase in signal from the film going from the blank chambers to chambers containing labeled target is an indication of non-specific binding. This may be due to either unblocked aldehydes or binding to the BSA itself.

With fluorophores excited at 546 and read at 610, there was virtually no increase with the oligo target, and more than a 10 fold increase with the biotin target.

TABLE 1

|  | Target Concentration [nM] | | | |
| --- | --- | --- | --- | --- |
|  | 0 | 1 | 10 | 100 |
| 6 um SA/biotin-Alexa546 | 14.0 | 170.0 | 113.0 | 160.0 |
| 3 um SA/biotin-Alexa546 | 7.8 | 105.0 | 94.0 | 105.0 |
| Oligo/cOligo-Tamra | 9.6 | 12.6 | 9.4 | 13.3 |

Note
"SA" in Table 1 refers to streptavidin.
Date in counts per second

The film exposed to the 10 μg/mL avidin-RPE target also exhibited little increase in fluorescence over the film in the blank well, rising from 7.0 to 9.3 cps.

With the mouse antibody target which was excited at 480 and read at 530, there was virtually no increase:

TABLE 2

|  | Target Concentration [nM] | | | |
| --- | --- | --- | --- | --- |
|  | 0 | 1 | 10 | 100 |
| Anti-mouse/MAb-Alexa488 | 4.0 | 4.7 | 6.2 | 7.9 |
| Biotin/MAb-Alexa488 | 5.8 | — | 8.1 | 6.6 |

Data in counts per second
Mab = Mouse monoclonal antibody

E. Reaction Chambers

Target solutions (See, Examples 2–5 below) were reacted with the film-immobilized particles by attaching chamber gaskets to the dip-coated microscope slides. Gaskets were employed which had four chambers, each one 6 mm wide× 19 mm long punched out of a common 0.5 mm thick silicone sheet (Molecular Probes, CoverWell Perfusion Chamber Gaskets). One side of the gasket was covered with a transparent plastic sheet with filling ports at the ends of each chamber. An adhesive covered the opposite side.

The gasket was attached by placing it adhesive side up on a black plastic block and pressing on a spotted microscope slide with the columns of spots running down the centers of the chambers. There were typically six spots in each chamber centered between the filling ports. A leak-proof seal was obtained by rolling the gasket-slide sandwich over a 1" diameter cylindrical plastic bottle.

The chambers were filled with approximately 70 μL of target solution using a 100 μL pipet. The short axis of each slide was oriented almost vertically so that the chamber was filled from the top and air escaped from the bottom. After all four chambers were filled, the slides were placed horizontally on a flat surface and excess solution at the ports was wicked away with filter paper. The ports were then sealed with adhesive-backed discs (Molecular Probes, Adhesive Seal Tabs).

Test slides were assembled to determine the integrity of the seal between the film and the gasket. A 1 mM solution of NBB (Naphthol Blue Black, Aldrich) in 1% BSA/PBS was injected into the chambers, and the adhesive side examined visually over 4 hours for the presence of stain outside the chamber area. A one pound steel weight was placed on top of the chamber to eliminate leaks.

For hybridizations at elevated temperatures, the gasket-slide assembly was placed inside a hybridization chamber (Corning, CMT Hybridization Chamber). The assembly was placed (gasket-side up) on the chamber base, the cover was placed over the two alignment pins and the two retaining clips attached to the sides. It was then placed on a platform on the bottom of a water bath.

F. Final Wash

Target capture reactions were terminated by peeling off the chamber gasket, flicking the slide to remove retained drops of target solution, and placing the slide in a coplin staining jar filled with 50 mL of a buffer/detergent wash solution (PBS/0.01% Tween 20 for protein targets, 6×SSC/ 0.01% SDS for DNA targets). Additional washes could be performed by emptying the jar and refilling with buffer/ detergent solution. Unbound and loosely bound materials were removed by gently shaking the jar to agitate the wash solution.

After washing, the slides were removed from the staining jar and rinsed in a beaker of DI water. They were removed from the final rinse and retained water was blown off with a stream of dry $N_2$. Arrays were stored at ambient temperature and humidity in a microscope slide storage box until read on the imaging system.

G. Image Acquisition

Transmitted light and epi-fluorescence images were acquired on a Zeiss Axiovert 135 M inverted microscope with a Princeton Instruments PentaMax camera. The camera was mounted on the underside of the microscope in line with the objective. A motorized mirror switched the image between the camera and the binocular eyepieces. A lens in the camera mounting tube relayed the image to the face of the CCD (charge coupled device). The mirror motor was driven by a Lud1 contoller though push buttons. The stage was also motorized and driven with through the Ludl controller which used a joystick for X and Y motions and a rotary input for focusing.

A 100W mercury lamp provided illumination through epi-fluorescence optics. A 20× objective was used for all images. Two filter sets, 480/535 and 545/610, were mounted in the slider block. The 480 nm and 545 nm excitation filters had bandwidths of, respectively, 40 nm and 30 nm. The bandwidths of the 535 and 610 emission filters were, respectively, 50 run and 75 nm. The dichroic beamsplitters had 505 nm and 570 nm transmittance midpoints.

The camera's CCD was a Kodak KAF-1400 chip with 1317H×1035V pixels cooled to −35° C. Charges were measured with a 12 bit A/D converter and sent to an interface card in a PC computer equipped with 64 MB RAM and a CD writer. Images were acquired with WinView software and stored on CD-R discs in TIFF format.

To acquire an image, a spot on the film-coated slide was first positioned under the objective using the joystick. The slide was observed though the binocular eyepieces with transmitted light turned down to its lowest level. The fluorescence illumination was shuttered off with the slider in the illuminator tube, and the image was switched to the eyepieces. After an area of the spot was selected, the image was then switched to the camera, and re-focused by observing a region 506H×512V pixels in the center of the CCD. Focusing was done either with transmitted light or fluorescence from the reference fluor in the particles.

A full-field transmitted light or reference fluor image was then captured, typically with exposure times of 0.01 to 0.2 seconds. By focusing with low-intensity transmitted light or longer wavelength excitation light, photo-bleaching of the target labels was minimized. The transmitted light and reference fluor images were also used to generate masks for measuring target fluorescence levels (see below).

Full-chip target fluorescence images were then acquired. The transmitted light was switched off and the slider opened which shuttered the mercury lamp, or the filter block was switched to the target fluor channel. The exposure time was initially set according to the expected intensity levels. This was adjusted by sampling from the subregion used for focusing. The individual pixel values were analyzed with the statistics tool. The exposure time was reduced if saturation levels of 4095 were detected. Each pixel was 6.8 µm square with a capacity for only 45,000 electrons. If the maximum level was less than 1024, exposure time was increased. Once the exposure time was set, a full-chip image was acquired and saved.

Figure 4:
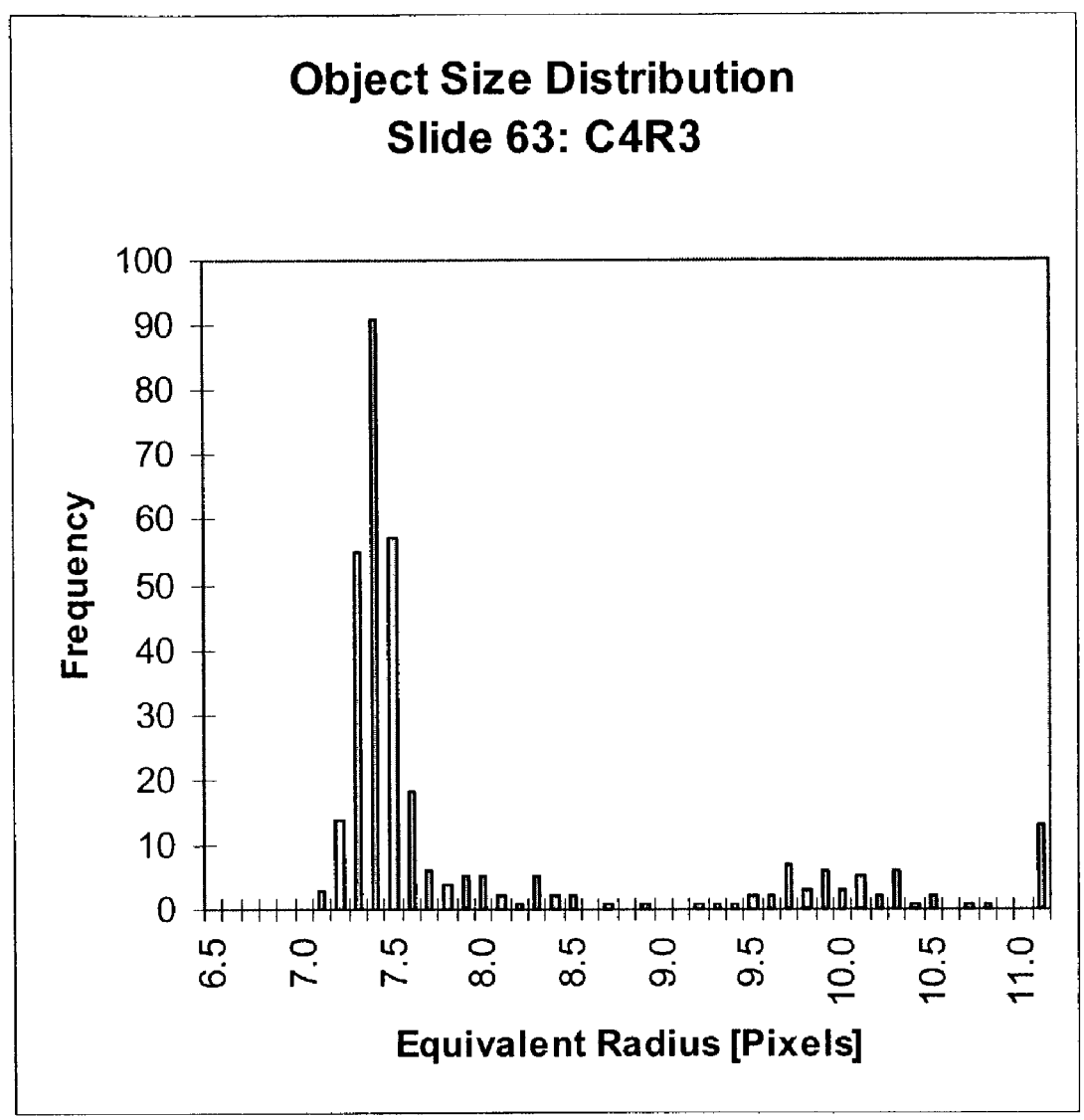
FIG. 4 shows an object size distribution for capture particles on slide 63, location C4R3.

Variation in diameters of the particle images can be used to indicate if all particles are in the same focal plane, which helps ensure fluorescence intensity is measured accurately. The distribution of equivalent radii from 3 µm streptavidin particles is shown in FIG. 4. In FIG. 4, the population centered on 7.4 pixels represents individual particles. Twin particles are the smaller population centered about 10.0. Gating on equivalent radii between 6.9 and 7.9 pixels, gives 253 objects with a mean of 7.38 and a standard deviation of 0.14. The coefficient of variation is 1.87%. The longer right tail is probably due more to the dilation algorithm than to particle geometry.

The linear relationship between the fluorescence signal and exposure time is demonstrated with the following biotin-particles/anti-biotin Alexa 488 target data from Slide 85: C3R2. Fluorescence intensities for 5 and 10 second exposures from 305 particles with equivalent radii between 7.5 and 8.5 were measured through the same mask according to the procedure described in the following section. The film background corrected minimum, maximum, median, average, and standard deviations are shown in the table below. All are average intensity counts calculated for the individual objects.

TABLE 3

| | Exposure Time[s] | | |
|---|---|---|---|
| | 5 | 10 | Ratio (10/5) |
| Film Background | 66.0 | 111.1 | 1.68 |
| Minimum | 1.7 | 3.0 | 1.75 |
| Maximum | 624 | 1215 | 1.95 |
| Median | 282 | 570 | 2.02 |
| Mean | 289 | 582 | 2.02 |
| Standard Deviation | 100 | 191 | 1.91 |

Data in counts

The ratios of all variables was close to 2, the ratio of exposure times.

H. Image Processing

Images were processed off-line with MetaMorph Version 4.5r4. Object data was transferred to an Excel workbook for further analysis described in the next section. Fluorescence intensities were measured with a binary mask generated from the transmitted light or reference fluor image. The basic steps were:
1. Create a binary mask from either the transmitted light or the reference fluor image.
2. Logically AND the binary mask with the target fluorescence image.
3. Measure average gray values and other object features with the Integrated Morphometry Analysis program.
4. Save features to data log and import into workbook for further analysis.

The mask was generated from an image where all the objects are of similar intensity since the apparent size of the object is proportional to its fluorescence intensity. A binary mask was created as follows:
1. Open the transmitted light or reference fluor image. For fluorescence images, the contrast is inverted with Ctrl-I or Display-Contrast shortcuts-Invert contrast. This creates a monochrome lookup table with brightness and contrast equal to 50, and gamma equal to 1. Set threshold with Ctrl-T or Measure-Threshold image. State is set to inclusive, the upper threshold corresponds to the maximum value in the image, and the lower threshold is adjusted to obtain objects approximately 7 to 9 pixels across. The lower threshold is set by looking at a small clusters of particles under 800% size. Preferably, the value of the low threshold and the size of the object in pixels is recorded manually.
2. Generate an initial binary mask from Process-Binary-Binarize.
3. Round out objects with one or more Dilate cycles (Dilate converts a black pixel to white if the number of neighboring white pixels exceeds a threshold. Thresholds of 2 to 4 were typically employed for 1 or 2 cycles without closure.

The mask is applied to any fluorescent image by Process-Arithmetic-Logical
1. Select the binary mask and the gray scale image
2. Click AND Film background was measured on the original fluorescence image with the Show Region Statistics tool. A region devoid of particles was manually selected. Features of the masked imaged were measured with the Integrated Morphometry Analysis, IMA, program. Features measured typically were: pixel area, shape factor, mean radius, equivalent radius (equivalent radius is the size of a disk containing the number of pixels in the objects), x & y centroid, average gray value (average gray value is the sum of the gray values divided by the number of pixels), x & y intensity center, radial dispersion (radial dispersion is an intensity weighted equivalent radius. A disk of this radius multiplied by the average gray value would give the total intensity). Data was saved in a text-format object log along with annotations that included spot identification and background levels.

IMA analysis was performed as follows:
1. Open the IMA program by selecting Process -Integrated Morphometry Analysis
2. Open a text object log
3. Select the features to be measured and logged
4. Click on Measure and the processed object are displayed on the image. Green indicates selected objects, red is objects which are not characterized, usually because they are on the edge of the image.

After all images were measured, the object data were saved on a floppy or Zip disc for later analysis with Excel. Processed images were usually not saved.

I. Object Analysis

Object size and shape were used to sort individual particles from all of the objects measured. Then a statistical analysis of average intensities (average gray value, or intensity, is the sum of the gray values divided by the number of pixels) was performed which determined the minimum, maximum, median, mean, and standard deviation. This was accomplished by first converting MetaMorph object logs into Excel workbooks. Then built-in functions and tools were used to analyze the data. All size measurements were in terms of pixels.

First the objects were ordered according to Equivalent Radius, EqRad, using the Sort tool. Then the distribution of EqRads was generated with the Histogram tool. Low and High limits were set plus and minus half a pixel about the median of the single particle population.

These limits were then used to set the range for the COUNT, MIN, MAX, AVERAGE, and STDEV functions. The coefficient of variation (CV) was calculated by dividing the standard deviation by the average. Rates were then determined by dividing these values by the exposure time.

Net median particle fluorescence, MPF, was determined by subtracting the film background, FBF, from the median particle value. The median was used to be less sensitive to asymmetric distributions. The ratio of MPF to FBF was calculated for all levels of target. The MPFs of the various levels of target were divided by the MPF of the blank, MPF0, as an indication of the signal to background ratio.

J. Fluorescent Particles

To demonstrate the range and precision of the image acquisition and process procedure, streptavidin-coated particles containing six different levels of a rhodamine dye were mixed together in equal proportions and spotted on a glyoxal agarose film coated on an aminosilane glass slide, following the high-humidity spotting protocol described above. The total particle concentration was 0.05% in 0.1M carbonate buffer, pH 9.5, with 20% ethylene glycol and 0.05% Tween20. After an overnight incubation, the slide was rinsed in DI water dried with a stream of $N_2$. Transmitted light and 545/610 fluorescent images were acquired with the instrumentation and procedures described in detail above. Particle fluorescence was measured with MetaMorph and analyzed in an Excel workbook.

Exposure times of 0.25, 0.5, 1, 2, 4, 8, 16, and 32 seconds were used to cover the range of dye intensities. One mask generated from the transmitted light image was used for all the images. It was acquired with the 545/610 filter set in place.

Figure 5:
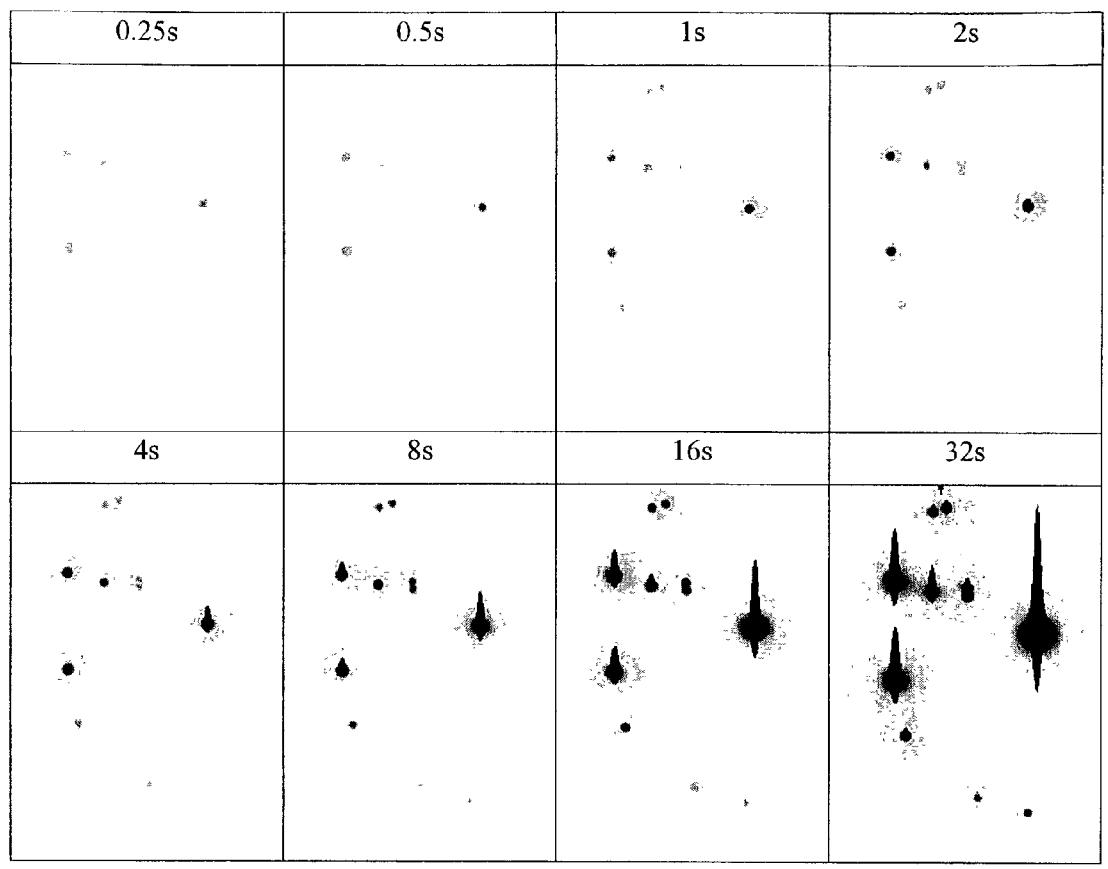
FIG. 5A shows a small section of the fluorescence images generated by fluorescently labeled particles, with exposure times of 0.25, 0.5, 1, 2, 4, 8, 16, and 32 seconds. A single value for each object was selected from all exposure times by finding the image with the largest average counts short of saturation. The rate was then calculated by subtracting film background and dividing by the exposure time. The distribution of the log of the rates is shown in FIG. 5B. The centers of the six populations are the dark lines.
Figure 5:
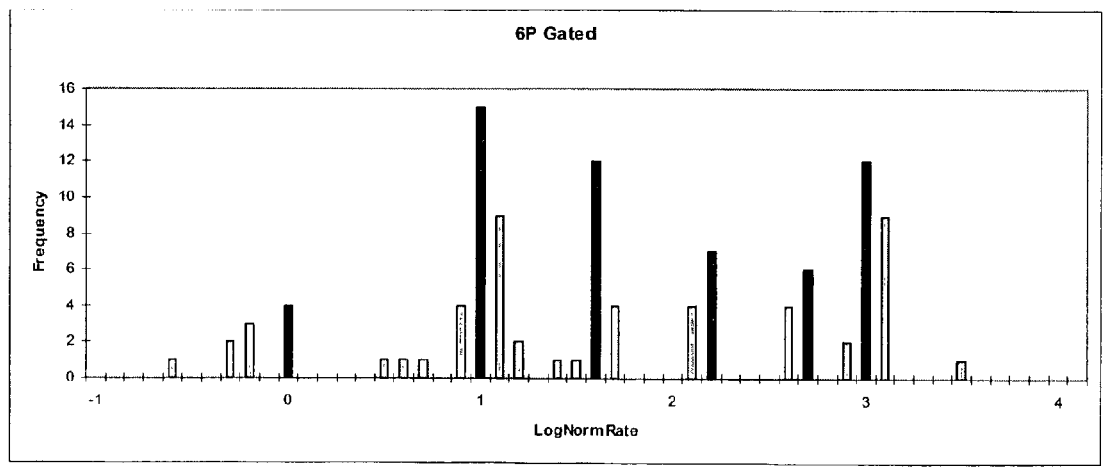

A small section of the fluorescence images, 182×282 pixels, is shown in FIG. 5A with the LUT inverted. Notice that the dimmest particles in the bottom right hand corner of FIG. 5A are only visible when the brightest particles are well past saturation.

A single value for each object was selected from all exposure times by finding the image with the largest average counts short of saturation. If the object average was less than $3/4^{ths}$ of the maximum 4095, there were few saturated pixels in the object. The rate was then calculated by subtracting film background and dividing by the exposure time. The distribution of the log of the rates is shown in FIG. 5B. The centers of the six populations are the dark lines. All populations are easily discriminated across the four logs of intensity.

Example 2

Film-immobilized Antibody-Coated Particles

This example describes the use of antibody-coated particles immobilized on a film to capture target molecules. Specifically, goat anti-mouse IgG(Fc) particles 3.2 μm in diameter (Sperotech, Inc., MPFc-30-5 Lot pO2), were spotted onto microscope slides coated with an AGA film following the ambient-humidity spotting protocol (See, Example 1). The particle concentration was 0.2% w/v in PBS, pH 7.4, with 0.05% Tween20. After BSA blocking and application of a four-well reaction chamber, the capture surface was reacted for 2 hours with mouse IgG labeled with Alexa Fluor 488 in 1% BSA/PBS (Molecular Probes, Inc., A-11243 anti-biotin, mouse monoclonal 2F5, Alexa Fluor 488 conjugate). Solutions containing target at concentrations of 100, 10, 1, and 0 nM were injected into the chamber wells, the ports covered with adhesive backed plastic, and the assembly was incubated in the dark at room temperature.

The reaction was stopped by peeling off the chamber and plunging the slide into a PBS 0.01% Tween 20 wash solution followed by gentle mixing. The slide was then transferred to a DI water rinse and dried with a stream of $N_2$. Transmitted light and 480/535 fluorescent images were acquired with the instrumentation and procedures described in detail in Example 1. Particle fluorescence was measured by the MetaMorph protocol and analyzed in an Excel workbook.

Figure 6:
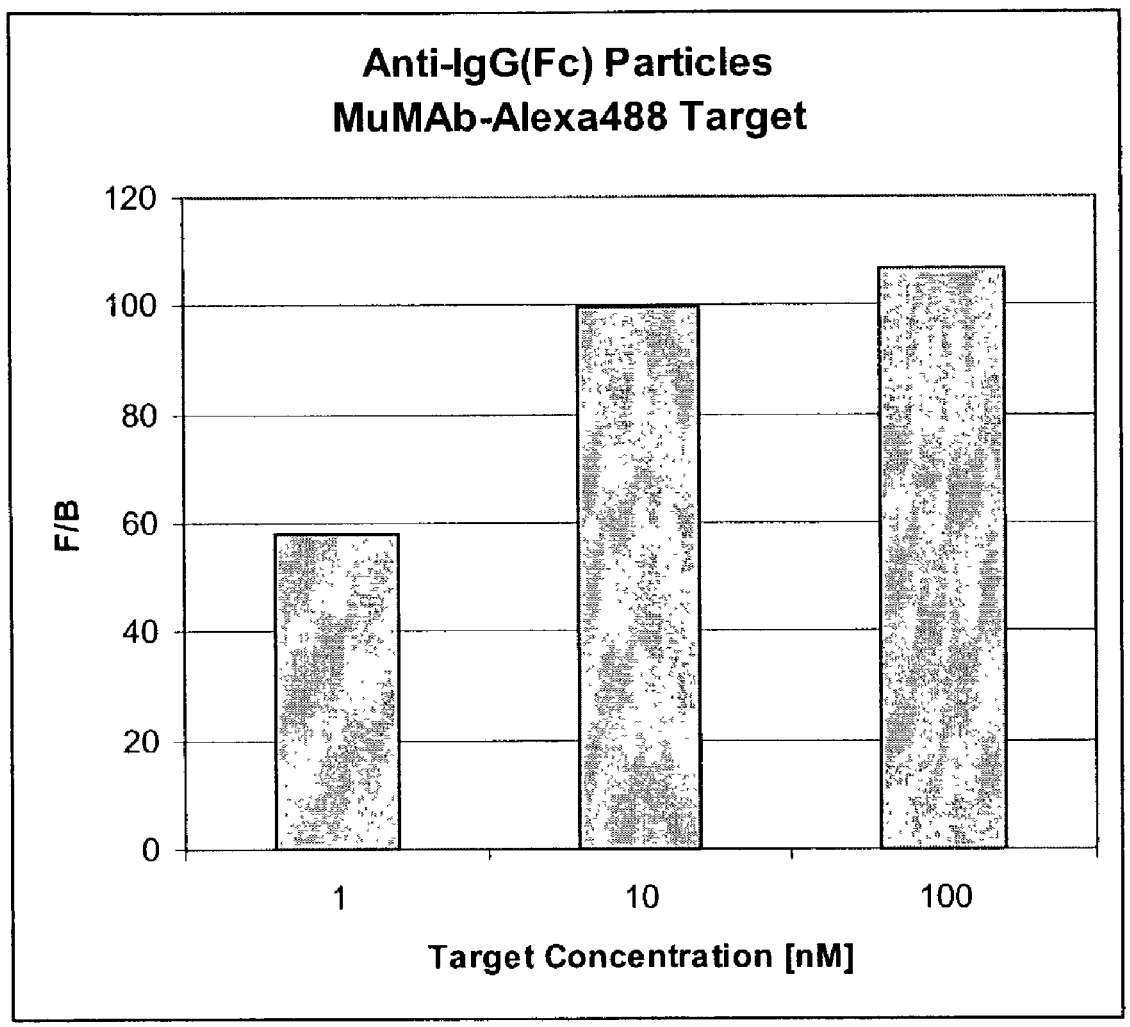
FIG. 6 shows the amount of fluorescence of captured target molecules bound by anti-IgG(Fc) film-immobilized capture particles divided by fluorescence of a blank particle (fib) with varying target concentrations tested.

The average fluorescence of the particles reacted with 100 nM target was 100 times the background fluorescence of the particles in the blank or 0 well. A graph of these F/B ratios for all three target concentrations is shown in FIG. 6.

A summary of the measurements from particles in the four wells is shown below in Table 4. There were approximately 80 single particles in each field of view. The film backgrounds increased slightly with target concentration. The medians of the distributions were very close to the averages. Coefficient of variation (CVs), the ratio of the standard deviation to the average, was in the range of 20 to 30 percent following target capture and less than 10% in the blanks.

TABLE 4

|  | Target Concentration [nM] | | | |
| --- | --- | --- | --- | --- |
|  | 0 | 1 | 10 | 100 |
| Spot Location | c2r4 | c1r5 | c4r4 | c3r5 |
| Exposure Time[s] | 40 | 20 | 10 | 10 |
| Film Background Rate, FB [cps] | 4.0 | 4.7 | 6.2 | 7.9 |
| Equvilent Radius Gate [Pixels]: | | | | |
| Lo | 5.7 | 6.0 | 5.9 | 6.0 |
| Hi | 6.7 | 7.0 | 6.9 | 7.0 |
| Number of Gated Particles in Field of View | 85 | 84 | 81 | 82 |
| Particle Fluorescence Rates [cps] | | | | |
| Minimum | 3.8 | 14.8 | 12.0 | 34.1 |
| Maximum | 6.4 | 62.6 | 66.2 | 74.1 |
| Median | 4.4 | 28.1 | 46.4 | 50.8 |
| Average | 4.5 | 29.6 | 44.5 | 50.7 |
| Standard Deviation | 0.3 | 8.8 | 12.3 | 9.4 |
| Coefficient of variation [%] | 6.9% | 29.8% | 27.60% | 18.6% |
| Net Median Particle Fluorescence, MPF[cps] | 0.40 | 23 | 40 | 43 |
| MPF/FBF | 1.10 | 5.97 | 7.45 | 6.41 |
| MPF/MPF0 |  | 58.2 | 99.5 | 106.8 |

Example 3

Film-immobilized Biotin-Coated Particles

This example describes the use of biotin-coated particles immobilized on a film to capture target molecules. Specifically, biotin-coated particles, 3.36 μm in diameter (Spherotech, Inc., TP-30-5, Biotin-Polystyrene Particles, 3.0–3.9 μm), were spotted onto a microscope slide coated with an AGA film following the high-humidity spotting protocol (See Example 1). The particle concentration was 0.2% w/v in 0.1M carbonate buffer, pH 9.5, with 20% ethylene glycol and 0.05% Tween20. After a 1 hour BSA block and drying in air for 1 hour, a four-well reaction chamber was applied to the film. The capture surface was then reacted for 2 hours with anti-biotin monoclonal antibody labeled with Alexa Fluor 488 (Molecular Probes, Inc., A-11243 anti-biotin, mouse monoclonal 2F5, Alexa Fluor 488 conjugate) and avidin labeled with R-phycoertyhrin (Molecular Probes, Inc.), both in 1% BSA/PBS. Solutions containing anti-biotin antibody target at concentrations of 100, 10 were injected into two of the chamber wells. A 10 μg/mL solution of R-phycoerythrin and a 1% BSA/PBS buffer blank were injected into the other two channels. The ports were covered with parafilm and a weighting block, and the assembly was incubated in the dark at room temperature.

The reaction was stopped by peeling off the chamber and plunging the slide into a PBS wash solution in a coplin staining jar followed by gentle mixing. The wash solution exchanged twice and then the slide was transferred to a DI water rinse and dried with a stream of $N_2$. Transmitted light and 480/535 fluorescent images were acquired with the instrumentation and procedures described in Example 1. Particle fluorescence was measured by the MetaMorph protocol and analyzed in an Excel workbook.

Figure 7:
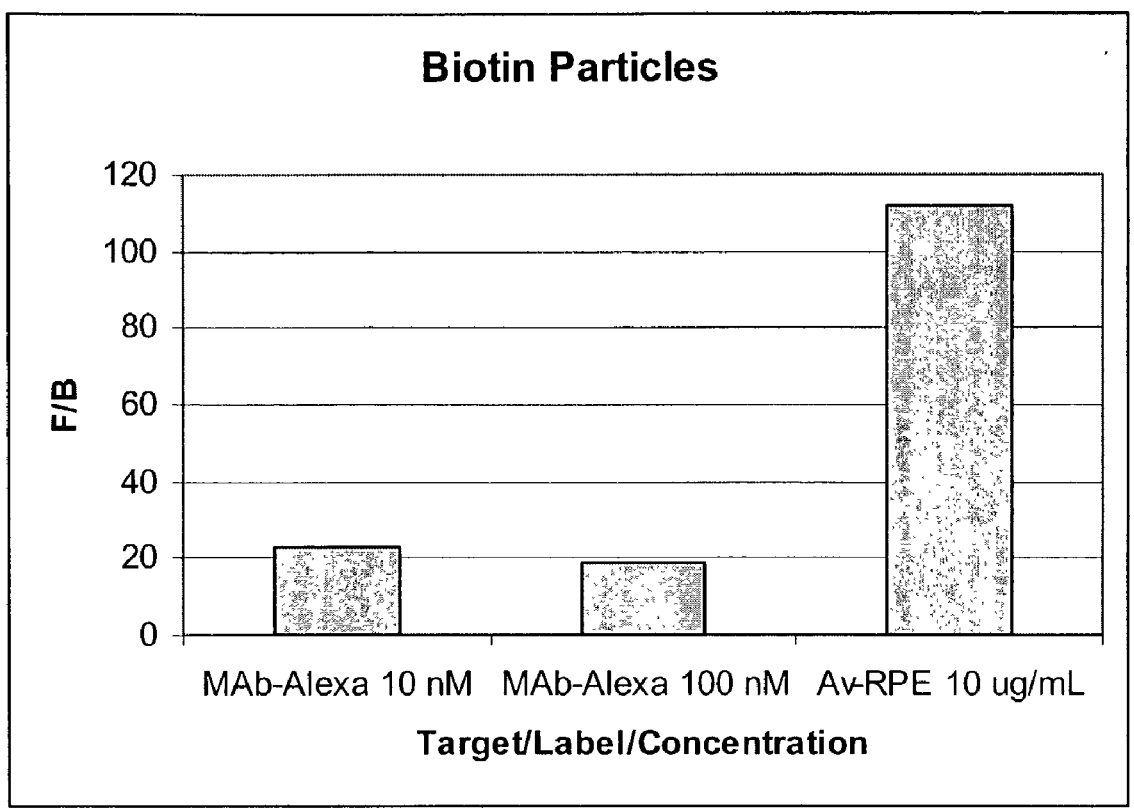
FIG. 7 shows the signal from biotin coated capture particles capturing 10 μg/mL R-Phycoerytin-labeled (RPE) Avidin was more than 100 times the levels from capture particles incubated with buffer, and signals from biotin coated capture particles reacted with either 10 or 100 nM Alexa 488 labeled anti-biotin antibody were approximately 20 times particle blanks.

As seen in FIG. 7, the signal from particles capturing 10 μg/mL RPE-labeled Avidin was more than 100 times the levels from particles incubated with buffer. Signals from particles reacted with either 10 or 100 nM Alexa 488 labeled anti-biotin antibody were approximately 20 times particle blanks.

As shown in Table 5, non-specific binding of target to the film gave readings slightly above blank levels -9.3 vs. 7.0 for Avidin-RPE and 8.1 and 6.6 vs 5.8 for Mab-Alexa 488. The blank film levels are due to the auto-fluorescence of the film. The medians were close to averages for all particles except the Avidin-RPE whose distribution was skewed to the right. Coefficients of variation were 25–30% for the particles capturing MAb-Alexa 488 and nearly 50% for particles capturing Avidin-RPE. Blank particles had CVs of 15% in the 485/530 channel and 5% in the 546/610 channel.

TABLE 5

| Target | Blank | Blank | Mab-Alexa Concentration | | Avidin-RPE |
|---|---|---|---|---|---|
|  | 0 | 0 | 10 nM | 100 nM | 10 ug/mL |
| Fluorescence Channel | 488 | 546 | 488 | 488 | 546 |
| Spot Location | c2r5 | c2r5 | c4r3 | c3r2 | c1r5 |
| Exposure Time[s] | 60 | 60 | 10 | 10 | 10 |
| Film Background, FB [cps] | 5.8 | 7.0 | 8.1 | 6.6 | 9.3 |
| Equivalent Radius Gate [Pixels]: | | | | | |
| Lo | 7.6 | 7.2 | 7.2 | 7.5 | 7.5 |
| Hi | 8.6 | 8.2 | 8.2 | 8.5 | 8.5 |
| Number of Gated Particles | 210 | 220 | 245 | 305 | 147 |
| Particle Fluorescence Rate [cps] | | | | | |
| Minimum | 6.1 | 6.5 | 21.3 | 11.4 | 22.0 |
| Maximum | 15.7 | 9.1 | 137.0 | 132.6 | 337.8 |
| Median | 8.9 | 7.7 | 81.8 | 68.1 | 82.5 |
| Average | 9.1 | 7.7 | 83.8 | 69.3 | 88.9 |
| Standard Deviation | 1.4 | 0.4 | 20.5 | 19.1 | 42.9 |
| Coefficient of variation [%] | 15.8% | 5.0% | 24.5% | 27.6% | 48.3% |
| Median Particle Fluor., PF[cps] | 3.2 | 0.66 | 74 | 61 | 73.2 |
| PF/FB | 0.55 | 0.09 | 9.14 | 9.24 | 7.87 |
| PF/PF0 | | | 23.2 | 19.2 | 111.6 |

Example 4

Film-immobilized Streptavidin-Coated Particles

This example describes the use of streptavidin-coated particles immobilized on a film to capture target molecules. Specifically, streptavidin-coated particles were shown to be functional after immobilization on films by capturing a biotin conjugated with Alexa 546. Streptavidin-polystyrene particles, 3.18 μm (Spherotech, Inc., SVP-30-5, Streptavidin-Polystyrene Particles, 3.0–3.9 μm) and 6.2 μm (Spherotech, Inc., SVP-60-5, Streptavidin-Polystyrene Particles, 6.0–8.0 μm) in diameter, and were spotted onto a microscope slide coated with an AGA film following the high humidity spotting protocol. The 3 μm particle concentration was 0.2% w/v while the 6 μm concentration was 0.1% w/v to have approximately equal capture areas. They were both spotted in 0.1M carbonate buffer, pH 9.5, with 20% ethylene glycol and 0.05% Tween20. Three spots of each particle solution were printed in each channel area. After a 1 hour BSA block and drying in air for 1 hour, a four-well reaction chamber was applied to the film. The capture surface was then reacted for 2 hours with biotin-Alexa Fluor 546 (Molecular Probes, Inc., A-12923) in 1% BSA/PBS Approximately 75 µL of target solution at concentrations of 100, 10, 1 and 0 nM were injected into the chamber wells. The ports were covered with parafilm and a weighting block, and the assembly was incubated in the dark at room temperature.

Figure 8:
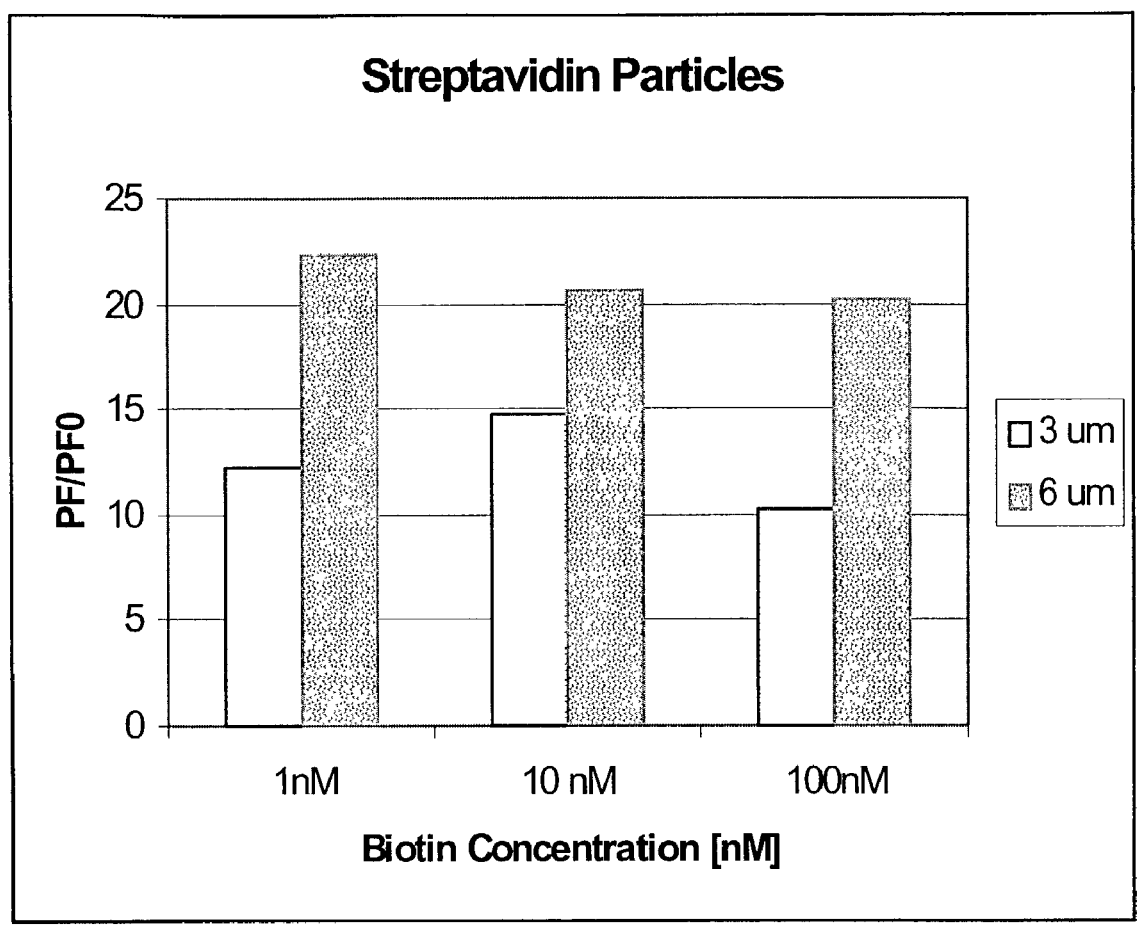
FIG. 8 shows the amount of target molecules (Alexa 546 coated biotin) bound by streptavidin coated film-immobilized capture particles with varying amounts of target concentrations for 3 micron and 6 micron diameter particles.

The reaction was stopped by peeling off the chamber and plunging the slide into a PBS wash solution in a coplin staining jar followed by gentle mixing. The wash solution was exchanged twice, then the slide was transferred to a DI water rinse and dried with a stream of $N_2$. Transmitted light and 546/610 fluorescent images were acquired with the instrumentation and procedures described in detail in Example 1. Particle fluorescence was measured by the MetaMorph protocol and analyzed in an Excel workbook. The results are shown in FIG. 8.

The ratio of signal to background, as measured by the PF/PF0, was approximately 20 for the 6 µm particles at all three concentrations and 10 to 15 for the 3 µm particles. The film background was significantly higher in channels containing labeled target. For the 3 um particles, it ranged from 94 to 105 with label vs. less than 8 without. The 6 um particles showed a similar trend, showing backgrounds of 113 to 170 with label vs. 14 without.

Medians were close to the averages for all 6 µm and 3 µm particle spots. The standard deviations of the 3 µm particles were in the range of 12–18%. The 6 um particles showed CVs in the range of 12 to 18% at all levels. The complete data for the image analysis is shown in tables 6 and 7.

TABLE 6

3 um particles

| | Concentration | | | |
|---|---|---|---|---|
| | 0 | 1 nM | 10 nM | 100 nM |
| Spot Location | c2r2 | c1r3 | c4r3 | c3r2 |
| Exposure Time[s] | 30 | 0.4 | 1.0 | 0.4 |
| Film Background, FB [cps] | 7.8 | 105 | 94 | 105 |
| Equivalent Radius Gate [Pixels]: | | | | |
| Lo | 7.3 | 6.7 | 6.9 | 7.0 |
| Hi | 8.3 | 7.7 | 7.9 | 8.0 |
| Number of Gated Particles | 321 | 190 | 253 | 273 |
| Particle Fluorescence Rate [cps] | | | | |
| Minimum | 13.1 | 235.0 | 603.0 | 310.0 |
| Maximum | 31.0 | 2560.0 | 2652.0 | 2037.5 |
| Median | 18.3 | 1815.0 | 1949.0 | 1540.0 |
| Average | 18.4 | 1802.5 | 1961.0 | 1495.0 |
| Standard Deviation | 2.3 | 277.5 | 260.0 | 270.0 |
| Coefficient of variation [%] | 12.8% | 15.4% | 13.3% | 17.5% |
| Median Particle Fluor., PF[cps] | 10.5 | 1709 | 1855 | 1435 |
| PF/FB | 1.3 | 16.3 | 19.7 | 13.7 |
| PF/PF0 | | 12.2 | 14.8 | 10.2 |

TABLE 7

6 µm particles

| | Concentration | | | |
|---|---|---|---|---|
| | 0 | 1 nM | 10 nM | 100 nM |
| Spot Location | c2r6 | c1r4 | c4r6 | c3r5 |
| Exposure Time[s] | 4 | 0.2 | 0.4 | 0.2 |
| Film Background, FB[cps] | 14 | 170 | 113 | 160 |
| Equivalent Radius Gate [Pixels]: | | | | |
| Lo | 12.0 | 11.0 | 12.1 | 12.2 |

TABLE 7-continued

6 µm particles

| | Concentration | | | |
|---|---|---|---|---|
| | 0 | 1 nM | 10 nM | 100 nM |
| Hi | 13.0 | 12.0 | 13.1 | 13.2 |
| Number of Gated Particles | 46 | 58 | 54 | 35 |
| Min | 592 | 538 | 185 | 105 |
| Max | 1056 | 988 | 1710 | 952 |
| Particle Fluorescence Rate[cps] | | | | |
| Minimum | 148.0 | 2690.0 | 462.5 | 525.0 |
| Maximum | 264.0 | 4940.0 | 4275.0 | 4760.0 |
| Median | 187.3 | 4035.0 | 3697.5 | 3670.0 |
| Average | 192.8 | 3950.0 | 3617.5 | 3660.0 |
| Standard Deviation | 25.5 | 470.0 | 545.0 | 670.0 |
| Coefficient of variation [%] | 13.2% | 11.9% | 15.1% | 18.3% |
| Median Particle Fluor., PF[cps] | 173 | 3865 | 3585 | 3510 |
| PF/FB | 12.4 | 22.7 | 31.9 | 21.9 |
| PF/PF0 | | 22.3 | 20.7 | 20.3 |

Example 5

Film-immobilized Oligo-Coated Particles

This example describes the use of oligo-coated particles immobilized on a film to capture target molecules. Specifically, particles coated with DNA were shown to hybridize with a complementary target after immobilization on films. The reaction was carried out at or near the Tm of DNA sequence. The capture probe was biotynlated at the 5'-end (Immunicon, Inc., 5' biotin-GGTCAAGTTTTCGCAG-TAGA-fluorescein, SEQ ID NO:1) and coated onto 3.18 µm diameter streptavidin-polystyrene particles. The particles were coated at a density approximately 20% of the maximum. The particles were spotted onto a microscope slide coated with an AGA film at concentrations of 0.24% w/v and 0.12% w/v in carbonate buffer pH 9.5 with 20% ethylene glycol and 0.01% SDS following the high humidity spotting protocol. After a 1 hour BSA block and drying in air for 1 hour, a four-well reaction chamber was applied to the film. The capture surface was then reacted for 2 hours with a Tamra-labeled complementary 20-mer (Immunicon, Inc., 5' Tamara-TCTACTGCGAAAACTTGACC, SEQ ID NO:2) in 6×SSC with 0.01% SDS and 50 µg/mL tRNA (Sigma, R-5636, tRNA).

Figure 9:
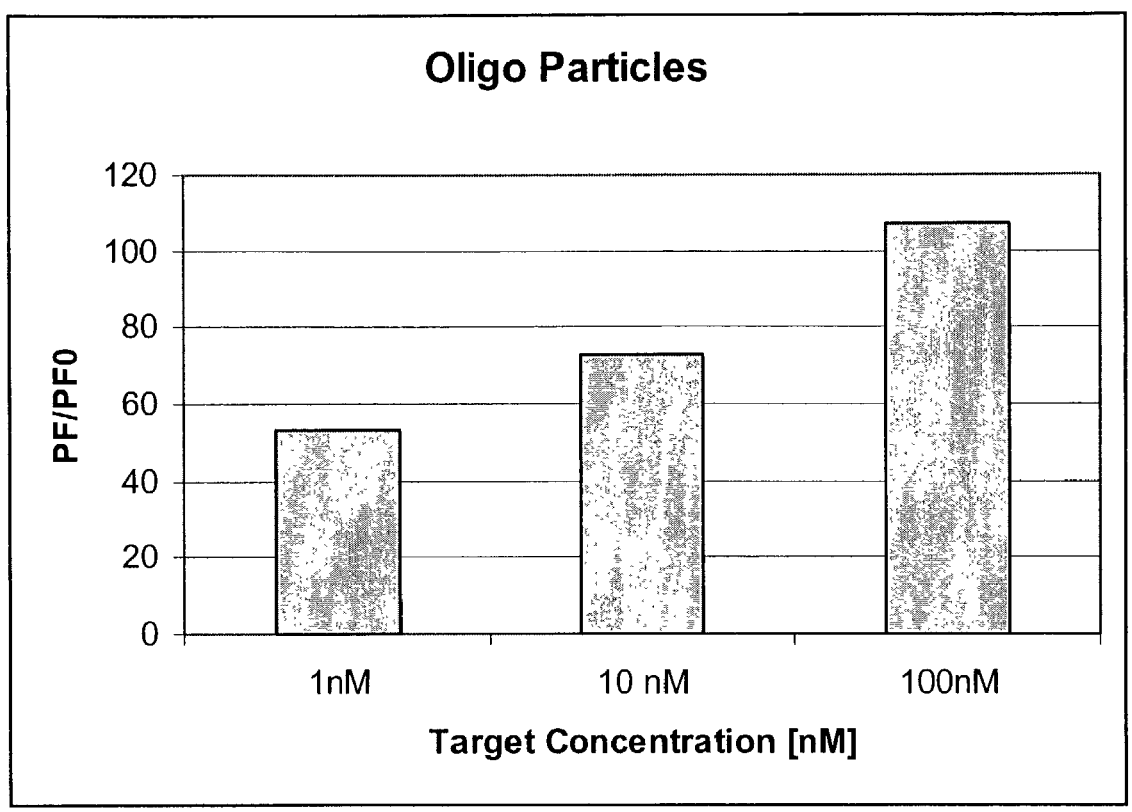
FIG. 9 shows the amount of target molecules bound by oligo coated film-immobilized capture particles with varying target concentrations.

Approximately 75 µL of target solution at concentrations of 100, 10, 1 and 0 nM were injected into the chamber wells. The ports were covered with adhesive dots. The slide assembly was loaded into a Coming CMT hybridization chamber and placed in a water bath at 46° C. Two hours later, the hybridization chamber was removed from the waterbath, opened, and the reaction was stopped by peeling off the well plate and plunging the slide into a 6×SSC 0.01% SDS wash solution in a coplin staining jar followed by gentle mixing. The wash solution was exchanged once, then the slide was transferred to a DI water rinse and dried with a stream of $N_2$. Transmitted light and 546/610 fluorescent images were acquired with the instrumentation and procedures described in Example 1. Particle fluorescence was measured with MetaMorph and analyzed in an Excel workbook. The results are shown in FIG. 9.

As seen in Table 8, the ratio of signal to background, as measured by the PF/PF0, ranged from 107 for the 100 nM target to 53 for the 1 nM target. Particles in the blank well were essentially indistinguishable from the film background, which gave a net particle fluorescence of 0.42. Film background remained relatively constant in the range of 9 to 13 cps.

TABLE 8

|  | Concentration | | | |
| --- | --- | --- | --- | --- |
|  | 0 | 1 nM | 10 nM | 100 nM |
| Spot Location | c2r2 | c4r2 | c1r5 | c3r2 |
| Exposure Time[s] | 100 | 2 | 20 | 20 |
| Film Background, FB [cps] | 9.6 | 12.6 | 9.4 | 13.3 |
| Equivalent Radius Gate [Pixels]: | | | | |
| Lo | 6.6 | 7.0 | 6.5 | 6.6 |
| Hi | 7.6 | 8.0 | 7.5 | 7.7 |
| Number of Gated Particles | 237 | 213 | 123 | 270 |
| Particle Fluorescence [cps] | | | | |
| Minimum | 8.7 | 22.2 | 28.4 | 33.3 |
| Maximum | 11.5 | 78.4 | 88.2 | 147.2 |
| Median | 10.0 | 34.9 | 39.9 | 58.2 |
| Average | 10.0 | 36.1 | 42.0 | 61.4 |
| Standard Deviation | 0.5 | 7.7 | 9.5 | 16.3 |
| Coefficient of variation [%] | 5.2% | 21.2% | 22.6% | 26.5% |
| Net Particle Fluor., PF[cps] | 0.42 | 22.3 | 30.6 | 44.9 |
| PF/FB | 0.04 | 1.77 | 3.27 | 3.39 |
| PF/PF0 |  | 53.1 | 72.7 | 106.9 |

Example 6

Detection of Biotin-Alexa Targets with Streptavidin Capture Particles

This example describes the use of film-immobilized streptavidin capture particles to detect various biotin-Alexa concentrations in a test sample. Calculations were made indicating that 0.5% w/v particles of diameter 3.18 µm have a concentration of $2.8 \times 10^{11}$ particles/L. Therefore, a volume of 21.2 µL contains $6 \times 10^6$ particles that will have approximately $18 \times 10^{12}$ binding sites or $3 \times 10^{-11}$ moles of sites.

To provide 1 target for every streptavidin capture reagent, $3 \times 10^{-11}$ moles of target in a volume of 300 µL will have a concentration of approximately $1 \times 10^{-7}$ mol/L. Therefore, a 1:4 dilution series was made up starting at $4 \times 10^{-7}$ mol/L target. That was made by adding 37 µL of stock A5 (a solution of biotin-Alexa 546 in phosphate buffer) to 363 µL PBS Tw. The stock was in pH 7 phosphate buffer and had an absorbance of 0.428. Assuming an extinction coefficient of 99,000, that gives the stock a concentration of approximately $4.32 \times 10^{-6}$ mol/L.

Specifically, 3.18 µm streptavidin particles (Spherotech SVP-30-5), with a capacity of approximately 3 million binding sites per capture particle, were incubated with the dilution series of biotin-Alexa 546 target molecules (Molecular Probes, A-12923). Each tube contained 6 million particles (21.2 µL of the 0.5% particle suspension) in 300 µL of target in a PBS 0.01% Tween 20 buffer coating solution. In Sample 1, the number of target molecules was approximately four times the number of streptavidin binding sites on the particles. The reactions, however, were started by adding only 279 µL of target. That reduced the number of targets by 7%. The specific figures are shown in the table 9 below:

TABLE 9

|  | % Occupancy | Target Conc (M) | Molecules/ Tube | Molecules/ Particle |
| --- | --- | --- | --- | --- |
| 1 | 100% | 4.00E−07 | 6.72E+13 | 1.12E+07 |
| 2 | 93.3% | 1.00E−07 | 1.68E+13 | 2.80E+06 |
| 3 | 23.3% | 2.50E−08 | 4.20E+12 | 7.00E+05 |
| 4 | 5.83% | 6.25E−09 | 1.05E+12 | 1.75E+05 |
| 5 | 1.46% | 1.56E−09 | 2.62E+11 | 4.37E+04 |
| 6 | 0.364% | 3.91E−10 | 6.56E+10 | 1.09E+04 |
| 7 | 0.091% | 9.77E−11 | 1.64E+10 | 2.73E+03 |
| 8 | 0.023% | 2.44E−11 | 4.10E+09 | 6.83E+02 |
| 9 | 0.000% | 0 | 0.00E+00 | 0.00E+00 |

Tubes were vortexed 30 seconds immediately after adding target to get an even distribution of target on particles. All tubes were incubated 30 min with the target in a stationary rack. Two-hundred (200) µL of coating solution was left in 0.6 mL tubes. One-hundred (100) µL was transferred to 1.7 mL tubes, and unoccupied sites were filled with unlabeled biotin. One-hundred (100) µL was centrifuged for 30 seconds, and 90 µL was aspirated off. Then 1 mL of $10^{-7}$ mol/L biotin diluted from a stock solution of 1 µg/mL D-biotin was added to the pellet, and it was vortexed for 5 seconds. These were placed on a rocker for 2 hours. Particles were then washed by centrifugation, aspirating, adding 1 mL PBS and centrifuged and aspirated again. Particles were transferred back to 0.6 mL tubes by adding 50 µL PBS and transferring all of material in 1.7 mL tube to 0.6 mL tube. These were spun and the supernatants removed to leave less than 10 µL liquid in tubes.

Forty (40) µL CTEG spotting solution (carbonate, pH 9.5, 0.01% Tween, 20% ethylene glycol) was then added to each tube. This gave suspensions of 2 million particles in approximately 50 µL particle solution. Pooled samples with 10 µL from 3 tubes of different particle populations were then prepared, yielding four combinations. The combination number and the particle populations pooled are shown in table 10 below:

Table 10

| C1 | C2 | C3 | C4 |
| --- | --- | --- | --- |
| 100% | 23.3% | 1.46% | 0.091% |
| 93.3% | 5.83% | 0.364% | 0.023% |
| 23.3% | 1.46% | 0.091% | 0.000% |

Combination
C1 includes particles from tubes 1–3 in Table 9;
C2 includes particles from tubes 3–5 in Table 9;
C3 includes particles from tubes 5–7 in Table 9; and
C4 includes particles from tubes 7–9 in Table 9.

The individual samples in CTEG were stored in the refrigerator with the coating tubes. They were analyzed later in a flow cytometer for comparison purposes.

Particles were spotted on film coated slides prepared with a glyoxal agarose film coated on an aminosilane glass slide (CEL slides 51–100). The film coated slides were spotted under high humidity conditions. The slides were incubated in the humidity chamber for 10 minutes before spotting. Six replicates of each mixture were spotted in columns. The slides were incubated in the humidity chamber overnight. The next morning, the slide was blocked with BSA, washed in PBST, rinsed with DI water,0.01% Tw, and blow dried with $N_2$.

The first row of each column was read with the green excitation/emission filter (Chromatech 545/610), with the lamp running at 50% power. The focus was obtained in transmission mode, and then reading was done in fluorescence mode for variable lengths of time, depending on signal intensity.

An image processing procedure was used which eliminated the mask generated from the transmission image. The fluorescence image was thresholded at two or three non-overlapping intervals. For the lower threshold levels, previously counted objects were filtered out by setting filters on inner radius >2, outer radius <8, relative holes <0.02. The more fluorescent particles had big holes in their centers when the high threshold was dropped. The less fluorescent particles only came into the picture when the lower threshold was dropped. This procedure gave more precise results than using the transmission mask.

The measured intensities are shown in the table 11 below. CVs were less than 10% for all populations. The number of each population counted was typically between 20 and 30, and there were three under 20. The 44 in the first column is actually the sum of two populations.

Figure 11:
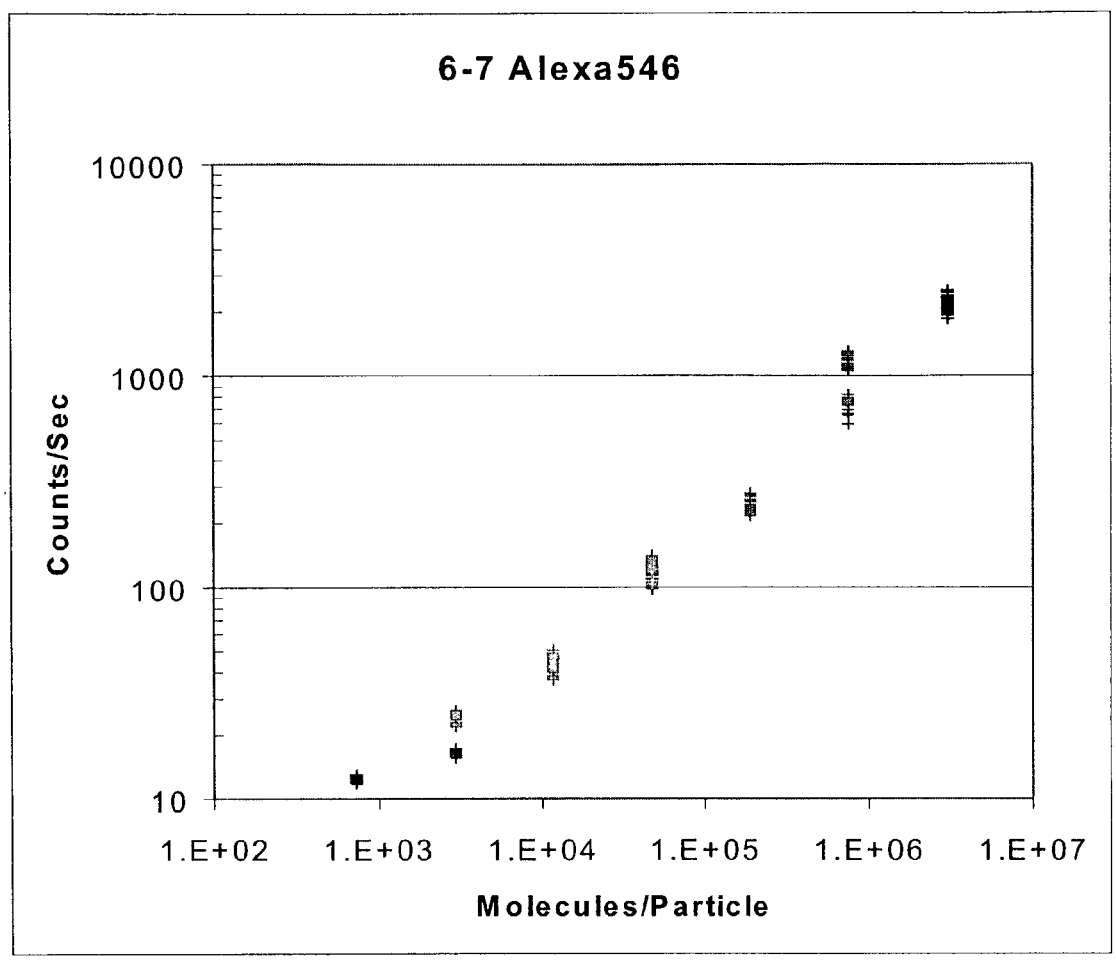
FIG. 11 shows a plot of fluorescence readings vs. the number of molecules per particle from Example 6.

Differences in fluorescence measurements due to the effects of photobleaching and focusing are apparent from discontinuities in the plot shown in FIG. 11.

Figure 12:
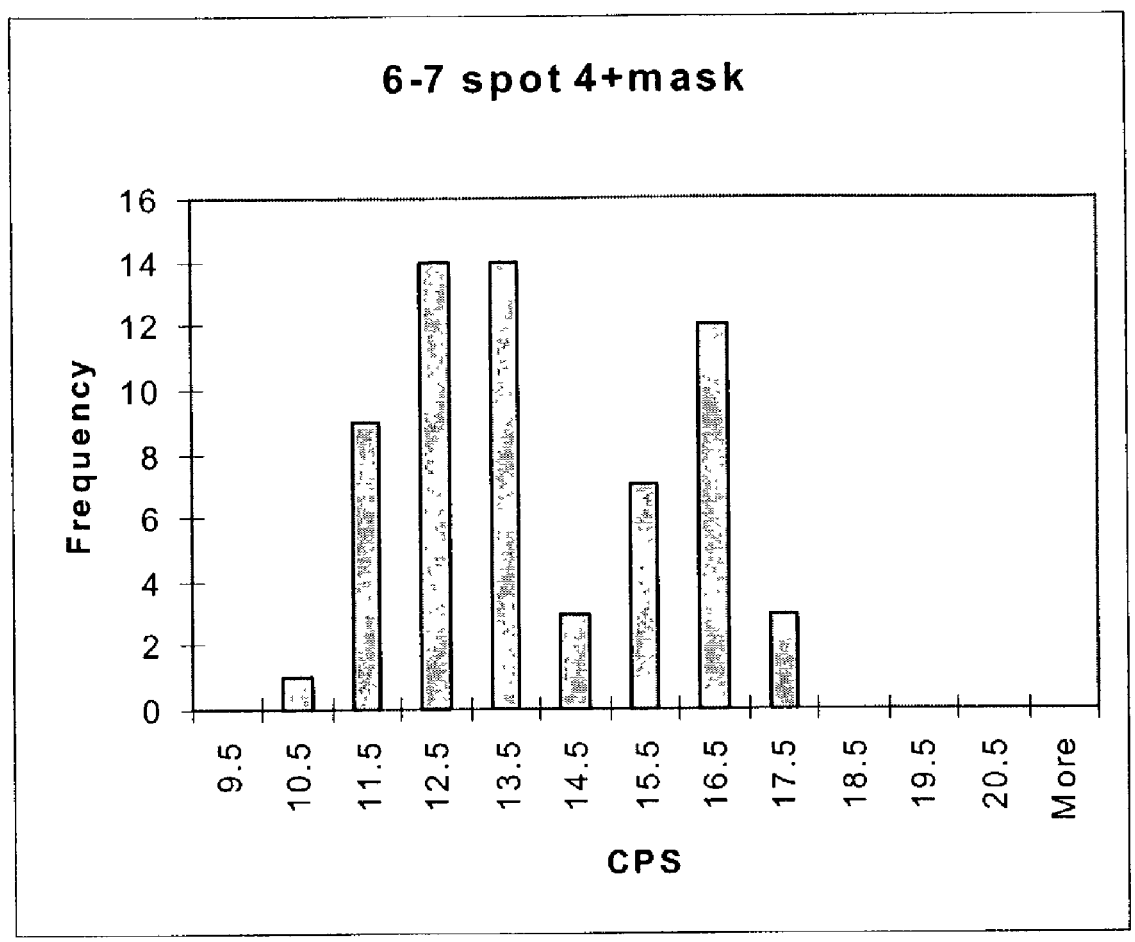
FIG. 12 shows the results from Example 6 when the objects were measured through a transmission mask.

When objects were measured through a transmission mask, the results were bimodal as shown in FIG. 12. The discrepancy between measurements with the transmission mask and measurements from the moving fluorescence threshold window (described above) is that with the fluorescence threshold the background is not uniform. The center is brighter than the edges. To correct for this effect, the MetaMorph function "Flatten Background" was used with an object size of 50 to give uniform background counts throughout the image.

Example 7

INVADER Assay Reactions with Film-immobilized Capture Particles

This example describes the use of the INVADER assay with the film-immobilized capture particles of the present

TABLE 11

| | | | | Comb. # | | | | | |
|---|---|---|---|---|---|---|---|---|---|
| 1 | 1 | 2 | 2 | 2 | 3 | 3 | 3 | 4 | 4 |
| | | | | Exposure Time [s] | | | | | |
| 1 | 1 | 2 | 2 | 2 | 10 | 10 | 10 | 200 | 200 |
| CV | 9.3% | 6.5% | 8.0% | 7.0% | 6.2% | 6.0% | 8.2% | 5.9% | 2.6% | 2.6% |
| N | 44 | 17 | 22 | 29 | 16 | 29 | 33 | 14 | 23 | 26 |
| SD | 201.97 | 76.44 | 59.04 | 17.20 | 6.93 | 7.73 | 3.49 | 1.42 | 0.42 | 0.32 |
| Mean[cps] | 2163.50 | 1177.71 | 735.27 | 246.42 | 112.72 | 128.27 | 42.53 | 24.24 | 16.50 | 12.41 |

Figure 10:
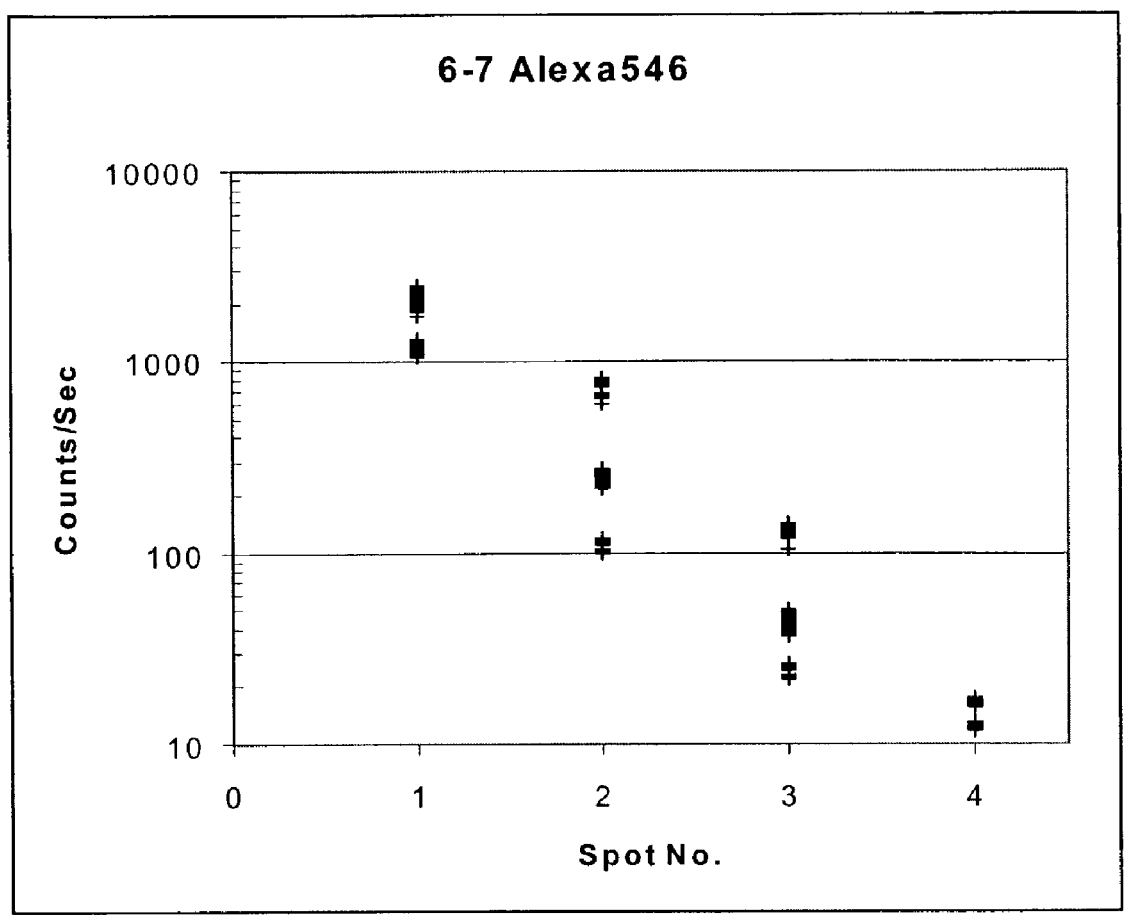
FIG. 10 shows a plot of fluorescence reading of particles from Example 6.

A log plot, shown in FIG. 10, shows that most of the populations are clearly distinguishable. The levels of target on each population are reproduced in table 12 below.

TABLE 12

| Occupancy | Molec/Part | Combination |
|---|---|---|
| 100% | 1.12E+07 | 1 |
| 93.3% | 2.80E+06 | 1 |
| 23.3% | 7.00E+05 | 1,2 |
| 5.83% | 1.75E+05 | 2 |
| 1.46% | 4.37E+04 | 2,3 |
| 0.364% | 1.09E+04 | 3 |
| 0.091% | 2.73E+03 | 3,4 |
| 0.023% | 6.83E+02 | 4 |
| 0.000% | 0.00E+00 | 4 |

Full occupancy corresponds to approximately 3 million molecules. A plot of relative particle fluorescence intensity is shown in FIG. 11, with each point on the graph representing the fluorescence intensity measured for a single particle. The lowest two groupings of points on the graph (fewest counts per second) are from combination 4. The next 2 groupings (with somewhat more counts per second) are from combination 3. The next highest grouping is actually two overlapping groups of points (both just over 100 counts per spot). One of these groups of points is from combination 3, while the other is from combination 2. The next two highest groupings are from combination 2. Finally, the highest two groupings of points (over 1000 counts per second) are from combination 1.

invention. Particles (e.g., streptavidin-coated particles) are coated with INVADER oligonucleotide sequences and probe sequences (e.g., biotinylated INVADER oligonucleotide and probe sequences) to form capture particles. These capture particles are spotted onto films (e.g., glyoxal agarose coated on an aminosilane glass slides). A second slide with a reaction well is filed approximately ⅔rds full with a test sample containing target molecules, along with a structure-specific enzyme. The well is sealed with the film-coated slide and placed on a rocker in an incubator oven at 54 degrees C. for several hours. The fluorescence on the particles is then read through the slide.

Example 8

APEX Reactions with Film-immobilized Capture Particles

This example describes the use of APEX assays with the film-immobilized capture particles of the present invention. Particles are coated with primers. Particles are spotted onto films (e.g., coated on an aminosilane glass substrate) (See, e.g., FIG. 13). A second slide with a reaction well is filed approximately ⅔rds full with a test sample containing target molecules, along with a structure-specific enzyme. The well is sealed with the film coated slide and placed on a rocker in an incubator oven at 54 degrees C. for several hours. The fluorescence on the particles is then read through the slide.

Example 9

Picomolar Detection

In the experiments described above, arrays of particles of diameters from ~3–6 μm immobilized in dip-coated glyoxal agarose films were utilized. Particles of this size were an appropriate size for analysis by flow cytometry. When pre-labeled particles were tested, it was possible to make quantitative comparisons of measurements from the imaging system with flow cytometric measurements of the same particles. It became clear, however, that when particles of this size were immobilized in the glyoxal agarose film, a considerable fraction of the microparticle was inaccessible. Transfer of target proteins to capture sites on these particles was slow, and therefore the method was not obtaining maximal signals.

To attain faster mass transport to the microparticle as well as for improved reaction kinetics and higher signals, a method was employed using much smaller particles and a significantly thinner film surface. For example, 0.8-μm-diameter particles were spotted onto aldehyde and epoxy activated hydrogel slides (NoAb Biodiscovery), which have a film thickness of approximately 0.1 μm.

In addition, a semi-automated alignment and autofocusing algorithm was developed for imaging and incorporated referencing spots into the microarrays to achieve the precise focus required for imaging 0.8-μm-diameter particles. Arrays were printed as a series of 9 spots arranged in a 3×3 array in which exterior 8 spots contained the experimental particles, while the central spot contained 8-μm-diameter streptavidin-coated particles that had been incubated with biotin-Alexa 546. These fluorescently labeled reference particles in the central spot served as a focusing reference. The imaging routine went first to this reference spot and set the correct focus. Then the imaging routine examined the exterior eight spots and recorded measurements of the particles in these spots.

Whereas the Metamorph program had previously been utilized for analysis of the larger particles, the new method employed the algorithms of Image Pro Plus (Media Cybernetics) to analyze data from the 0.8-μm-diameter particles.

These adjustments of microparticle size, film thickness, imaging algorithms, and data analysis resulted in significant enhancement of detection limits for the microparticle protein array. In the experiment described below, picomolar sensitivity was achieved for capture of a labeled protein onto particles coated with antibody capture probes.

With a robotic SPOTBOT Personal Microarrayer (Telechem International) equipped with Stealth Micro spotting pins, 0.8-μm-diameter particles coated with goat-anti-mouse antibody were printed onto NoAb Biodiscovery epoxy-hydrogel slides for one hour at 70% humidity. Array spots were printed in 3×3 array units with a focusing reference in the central spot, as explained above. After printing, the surface was blocked with BSA in tricine buffer, pH 8 and then rinsed with Tris-buffered saline.

Figure 14:
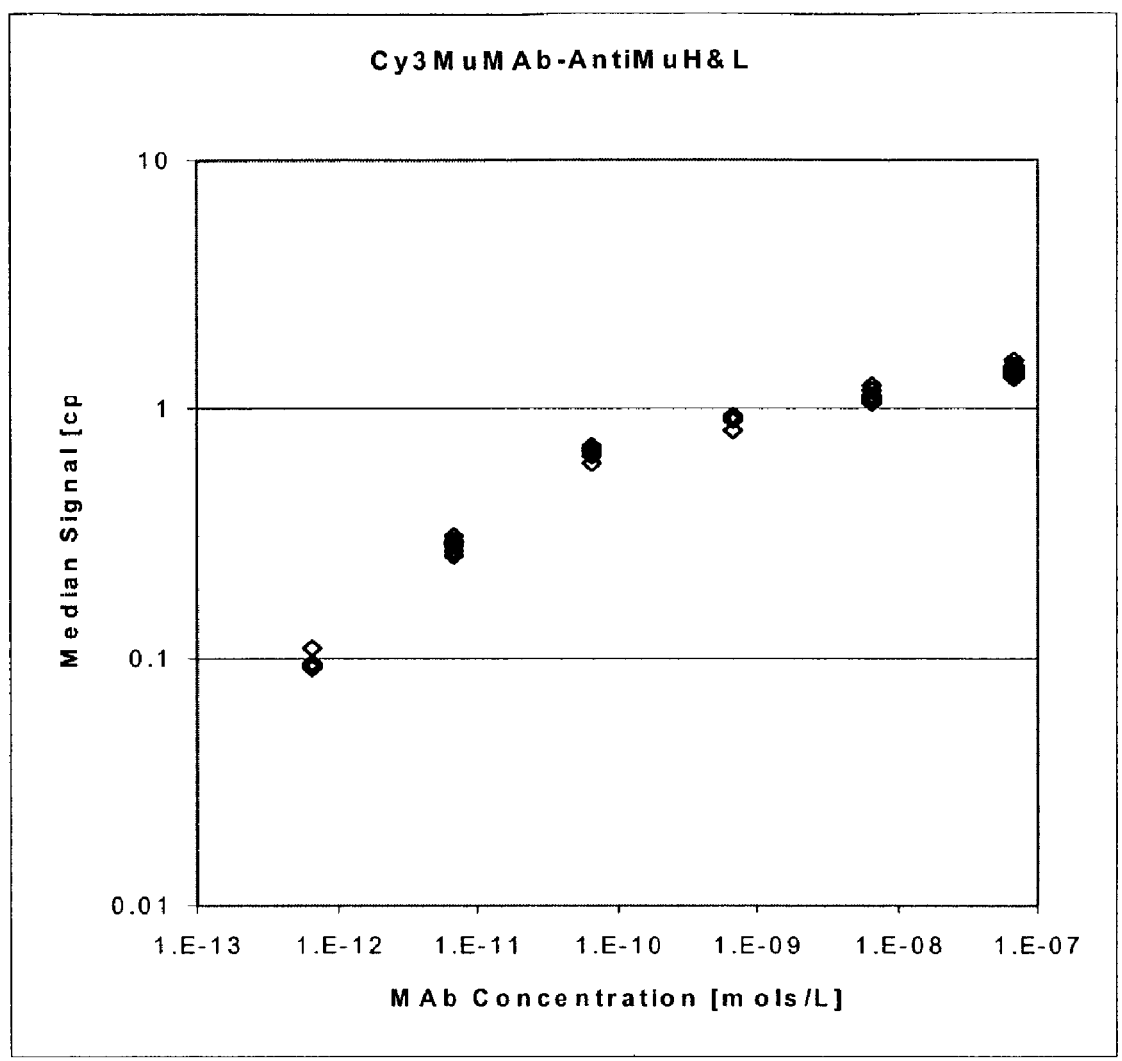
FIG. 14 shows a plot of median signals from an array scan, wherein the array in each reaction chamber contained eight replicate spots.

Six tenfold dilutions of the target protein, Cy3-labeled mouse monoclonal antibody (Amersham) were prepared in TBST (Tris buffered saline, 0.05% Tween 20)–1% BSA from $10^{-7}$ M to $10^{-12}$ M. For each dilution, 165 μl of antibody solution was added to a reaction chamber, and 165 μl of TBS-1% BSA with no antibody was added to a fourth chamber as a control. The arrays were incubated overnight at RT. The following morning, the slide was washed twice with TBST and once with deionized water. The slide was spun dry on a slide spinner (TeleChem International). Then the array was imaged by the semi-automated procedure, and data was analyzed with Image Pro software, as described above. The array in each reaction chamber contained eight replicate spots, whose median signals are plotted in FIG. 14.

Figure 15:
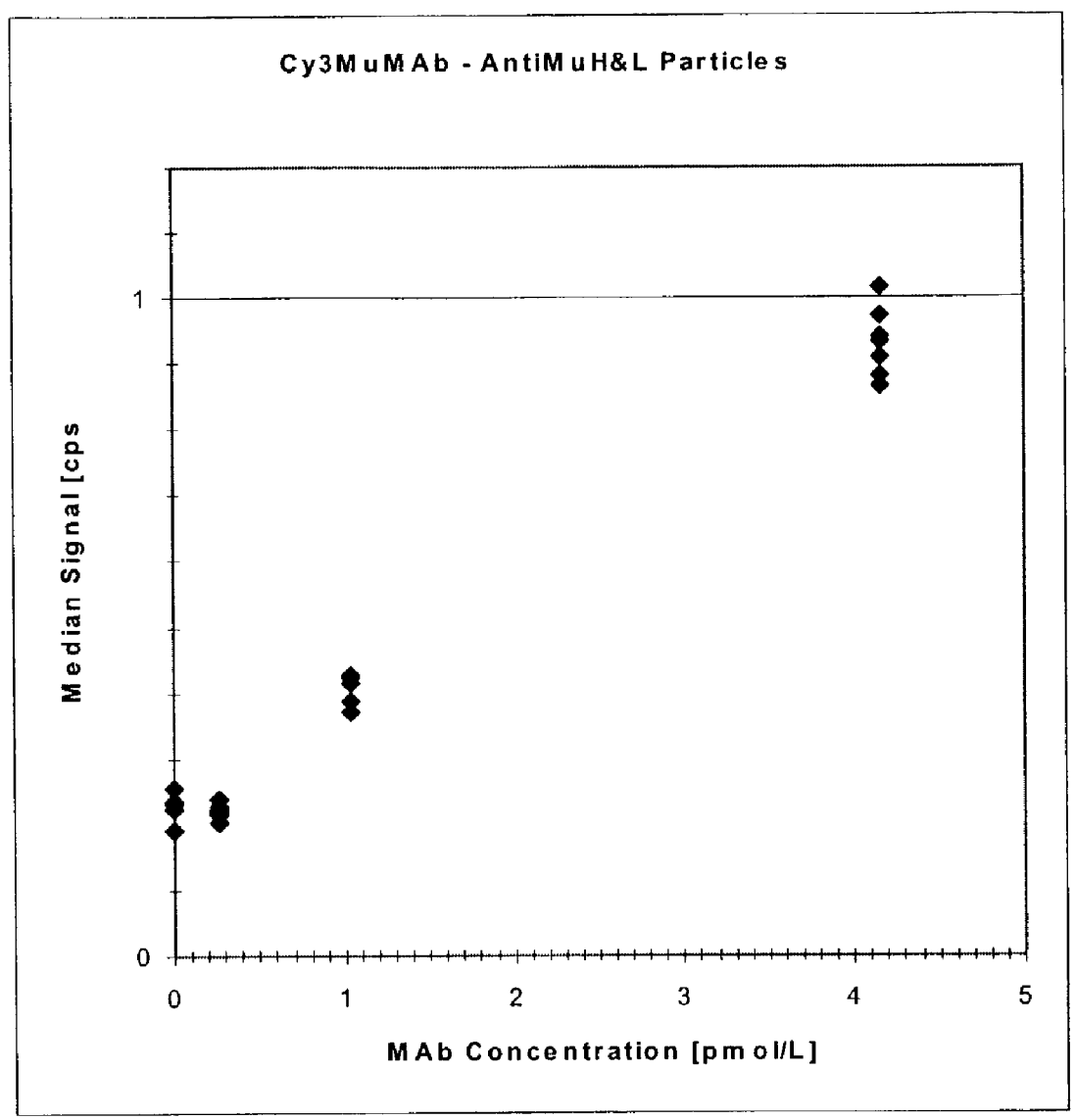
FIG. 15 shows a plot of the same target protein as FIG. 14, but the sample was diluted to concentrations of 4 pM, 1 pM, and 0.25 pM.

In a similar experiment, the same target protein was diluted in TBST-1% BSA to concentrations of 4 pM, 1 pM, and 0.25 pM. For each dilution, 165 μl of antibody was added to a reaction chamber, and TBST-1% BSA with no antibody was added to a fourth chamber as a control. The arrays were processed as described above. Data are plotted in FIG. 15.

Taken together, these studies demonstrate success for microparticle protein array technology and document a detection level of 1 pM for labeled protein captured by an antibody.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the relevant fields are intended to be within the scope of the present invention.

I claim:

1. A composition comprising a microarray, wherein said microarray comprises a substrate surface coated with an organic film, wherein said organic film comprises agarose, wherein said organic film further comprises a plurality of capture-spots, and wherein each of said capture-spots comprises a population of capture particles covalently bound to said organic film, and wherein each of said capture particles comprises a solid phase particle and a plurality of capture reagents attached to the surface of said solid phase particle.

2. The composition of claim 1, wherein said capture particles comprise at least two unique capture particle species.

3. The composition of claim 1, wherein said capture particles comprise at least 100 unique capture particle species.

4. The composition of claim 1, wherein the size of said capture particles is approximately 0.1–10 μm in diameter.

5. The composition of claim 1, wherein said capture reagents are selected from the group consisting of antibodies, haptens, ligand receptors, carbohydrates, proteins, aptimers, peptides, PNAs, artificial oligonucleotide structures, small molecules, drugs, oligonucleotides, biotin and streptavidin.

6. The composition of claim 1, wherein one or more components of an invasive cleavage assay is attached to the surface of said capture particles.

7. The composition of claim 1, wherein said capture particles are labeled.

8. The composition of claim 1, wherein said capture particles or said film comprises a functional group on its surface.

9. The composition of claim 8, wherein said functional group is selected from the group consisting of carboxyl, amino, carboxylates, esters, alcohols, carbamides, aldehydes, amines, sulfur oxides, nitrogen oxides, and halides.

10. The composition of claim 1, wherein said substrate surface is planar.

11. A system comprising:
i) a microarray, wherein said microarray comprises a substrate surface coated with an organic film, wherein said organic film comprises agarose, wherein said organic film further comprises a plurality of capture-spots, and wherein each of said capture-spots comprises a population of capture particles covalently bound to said organic film, and wherein each of said capture particles comprises a solid phase particle and a plurality of capture reagents attached to the surface of said solid phase particle; and
ii) at least one reaction component.

12. The system of claim 11, wherein one or more reaction components are attached to the surface of said capture particles.

13. The system of claim 11, wherein said capture particles comprise at least two unique capture particle species.

14. The system of claim 11, wherein said capture particles comprise at least 100 unique capture particle species.

15. The system of claim 11, wherein the size of said capture particles is approximately 0.1–10 µm in diameter.

16. The system of claim 11, wherein one or more capture reagents are attached to the surface of said capture particles.

17. The system of claim 16, wherein said capture reagents are selected from the group consisting of antibodies, haptens, ligand receptors, carbohydrates, proteins, aptimers, peptoids, PNAs, artificial oligonucleotide structures, small molecules, drugs, oligonucleotides, biotin and streptavidin.

18. The system of claim 11, wherein said reaction component is one or more components of an invasive cleavage assay.

19. The system of claim 11, wherein said capture particles are labeled.

20. The system of claim 11, wherein said capture particles or said film comprises a functional group on its surface.

21. The system of claim 20, wherein said functional group is selected from the group consisting of carboxyl, amino, carboxylates, esters, alcohols, carbamides, aldehydes, amines, sulfur oxides, nitrogen oxides, and halides.

22. A composition comprising a microarray, wherein said microarray comprises a substrate surface coated with an organic film, wherein said organic film comprises agarose, wherein said organic film further comprises a plurality of capture-spots, and wherein each of said capture-spots comprises a population of capture particles covalently bound to said organic film, and wherein each of said capture particles comprises a solid phase particle and a plurality of capture reagents attached to the surface of said solid phase particle, wherein said capture reagents comprise nucleic acids.

23. The composition of claim 22, wherein said nucleic acids are components of an invasive cleavage assay.

24. The composition of claim 23, wherein said invasive cleavage assay is a nucleic acid detection assay and said nucleic acids are selected from the group consisting of secondary probe oligonucleotide sequences and primary probe sequences.

* * * * *